(12) United States Patent  
Langoju et al.

(10) Patent No.: US 12,141,900 B2
(45) Date of Patent: Nov. 12, 2024

(54) MACHINE LEARNING GENERATION OF LOW-NOISE AND HIGH STRUCTURAL CONSPICUITY IMAGES

(71) Applicant: GE Precision Healthcare LLC, Milwaukee, WI (US)

(72) Inventors: Rajesh Veera Venkata Lakshmi Langoju, Bengaluru (IN); Utkarsh Agrawal, Bangalore (IN); Bipul Das, Chennai (IN); Risa Shigemasa, Tokyo (JP); Yasuhiro Imai, Tokyo (JP); Jiang Hsieh, Brookfield, WI (US)

(73) Assignee: GE Precision Healthcare LLC, Waukesha, WI (US)

( * ) Notice: Subject to any disclaimer, the term of this patent is extended or adjusted under 35 U.S.C. 154(b) by 375 days.

(21) Appl. No.: 17/543,234

(22) Filed: Dec. 6, 2021

(65) Prior Publication Data

US 2023/0177747 A1 Jun. 8, 2023

(51) Int. Cl.
*G06T 11/00* (2006.01)
*G06N 20/20* (2019.01)
(Continued)

(52) U.S. Cl.
CPC ............ *G06T 11/008* (2013.01); *G06N 20/20* (2019.01); *G06T 5/50* (2013.01); *G06T 5/70* (2024.01); *G06T 2207/20084* (2013.01)

(58) Field of Classification Search
CPC ........... G06T 2207/20084; G06T 2207/20081; G06T 5/70; G06T 2207/10081;
(Continued)

(56) References Cited

U.S. PATENT DOCUMENTS

2019/0108441 A1\* 4/2019 Thibault .............. G01N 23/046
2019/0108904 A1\* 4/2019 Zhou .......................... G06T 5/70
(Continued)

FOREIGN PATENT DOCUMENTS

WO  WO-2022212953 A1 \* 10/2022

OTHER PUBLICATIONS

Missert, Andrew D et al. "Synthesizing images from multiple kernels using a deep convolutional neural network." Medical physics (2019): n. pag. (Year: 2019).\*
(Continued)

*Primary Examiner* — Ian L Lemieux
*Assistant Examiner* — Woo C Rhim
(74) *Attorney, Agent, or Firm* — Amin, Turocy & Watson, LLP

(57) ABSTRACT

Systems/techniques that facilitate machine learning generation of low-noise and high structural conspicuity images are provided. In various embodiments, a system can access an image and can apply at least one of image denoising or image resolution enhancement to the image, thereby yielding a first intermediary image. In various instances, the system can generate, via execution of a plurality of machine learning models, a plurality of second intermediary images based on the first intermediary image, wherein a given machine learning model in the plurality of machine learning models receives as input the first intermediary image, wherein the given machine learning model produces as output a given second intermediary image in the plurality of second intermediary images, and wherein the given second intermediary image represents a kernel-transformed version of the first intermediary image. In various cases, the system can generate a blended image based on the plurality of second intermediary images.

20 Claims, 20 Drawing Sheets

(51) Int. Cl.
*G06T 5/50* (2006.01)
*G06T 5/70* (2024.01)

(58) Field of Classification Search
CPC ........... G06T 2207/10088; G06T 2207/30004; G06T 2211/441; G06T 11/008; G06T 7/0012; G06T 3/4053; G06T 3/4046; G06T 2210/41; G06T 5/00; G06T 5/73; G06T 11/005; G06T 2207/10116; G06T 11/003; G06T 2207/10072; G06T 2207/20182; G06T 2211/421; G06T 2211/424; G06T 7/11; G06T 2200/04; G06T 2207/20004; G06T 2207/20221; G06T 2207/30008; G06T 15/503; G06T 2207/30061; G06T 5/50; G06N 3/045; G06N 3/08; G06N 3/084; G06N 20/00; G06N 3/0464; G06N 20/10; G06N 20/20; G06N 3/02; G06V 2201/03; G06V 10/454; G06V 10/30; G06V 10/771; G06V 10/40; G06V 10/7715; G16H 30/40; G06F 18/214; A61B 6/032; A61B 6/5258; A61B 5/7203
See application file for complete search history.

(56) References Cited

U.S. PATENT DOCUMENTS

| | | | |
|---|---|---|---|
| 2020/0065940 A1* | 2/2020 | Tang | G06T 3/40 |
| 2020/0126190 A1* | 4/2020 | Lebel | G06T 5/70 |
| 2020/0311878 A1* | 10/2020 | Matsuura | G06V 10/82 |
| 2021/0007694 A1* | 1/2021 | Hein | A61B 6/4233 |
| 2021/0027430 A1* | 1/2021 | Yamamoto | G06T 7/0012 |
| 2021/0158533 A1* | 5/2021 | Cui | G06T 1/20 |
| 2021/0174501 A1* | 6/2021 | Takeshima | G06T 5/50 |
| 2021/0272240 A1* | 9/2021 | Litwiller | G06T 7/0012 |
| 2021/0279847 A1* | 9/2021 | Nett | A61B 6/027 |
| 2021/0358183 A1* | 11/2021 | Yu | G16H 30/20 |
| 2022/0015662 A1* | 1/2022 | Schlemper | G06T 7/0012 |
| 2022/0020146 A1* | 1/2022 | Lyu | G06N 3/047 |
| 2022/0036550 A1* | 2/2022 | Zhang | G06N 3/045 |
| 2022/0092755 A1* | 3/2022 | Lyu | G06T 5/00 |
| 2022/0327662 A1* | 10/2022 | Matsuura | G06T 3/4046 |
| 2022/0343496 A1* | 10/2022 | Zhang | G06T 11/008 |
| 2022/0414832 A1* | 12/2022 | Hu | G06T 5/70 |
| 2023/0011759 A1* | 1/2023 | Lu | G06T 5/20 |
| 2023/0252607 A1* | 8/2023 | Schnellbaecher | G06T 5/20 382/157 |
| 2023/0281889 A1* | 9/2023 | Kobayashi | A61B 6/5282 382/131 |
| 2024/0177378 A1* | 5/2024 | Yu | G06T 11/008 |

OTHER PUBLICATIONS

Noroozi, M. et al. | "Unsupervised Learning of Visual Representations by Solving Jigsaw Puzzles". http://arxiv.org/abs/1603.09246, Aug. 22, 2017, 19 Pages.

Matsuura, M. et al. | "Feature-Aware Deep-Learning Reconstruction for Context-Sensitive X-ray Computed Tomography". IEEE Transactions On Radiation and Plasma Medical Sciences, vol. 5, No. 1, Jan. 2021, 9 pages.

* cited by examiner

1502
1504
FIG. 15

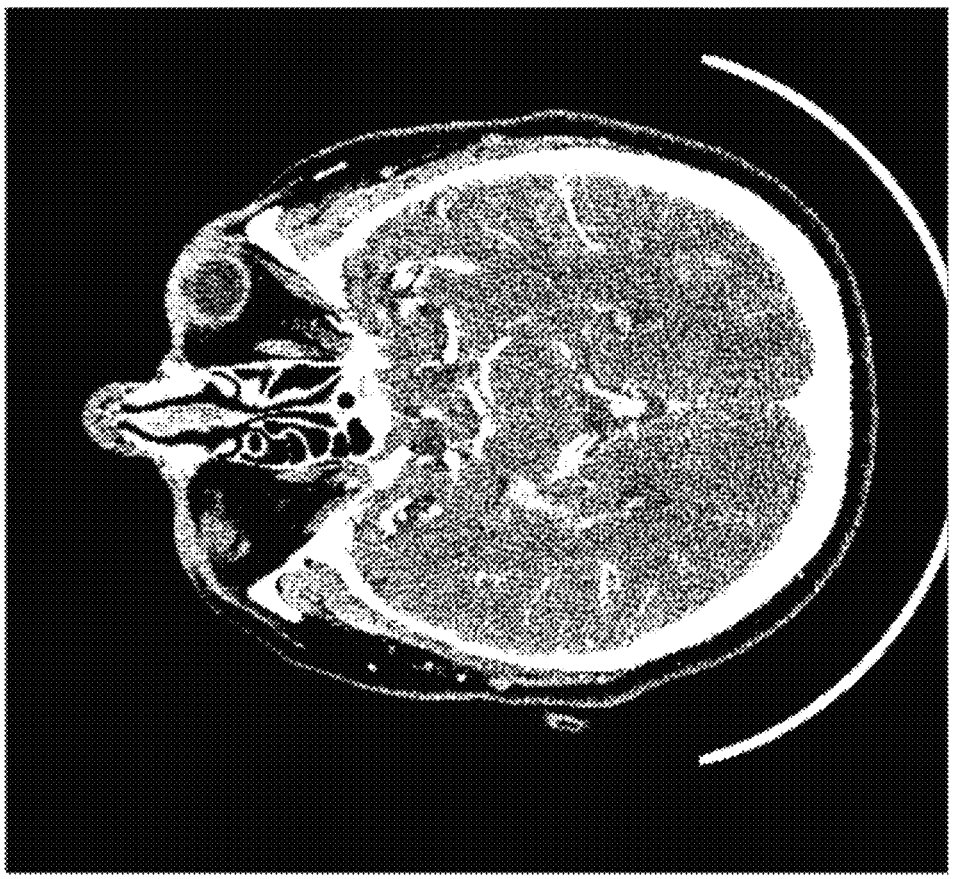
FIG. 16

MACHINE LEARNING GENERATION OF LOW-NOISE AND HIGH STRUCTURAL CONSPICUITY IMAGES

TECHNICAL FIELD

The subject disclosure relates generally to machine learning, and more specifically to machine learning generation of low-noise and high structural conspicuity images.

BACKGROUND

A computed tomography (CT) image is often captured or generated via CT imaging equipment that is set at a given energy and dose level and reconstructed with a desired frequency kernel setting. The choice of frequency kernel is decided based on the clinical application and the structure of diagnostic interest. While high frequency kernels have better structural conspicuity and sharpness, they suffer from high noise and loss of contrast in soft tissues. On the other hand, low frequency kernels are well-suited for soft tissue analysis and provide low noise and good contrast, but such low frequency kernels result in low resolution. So, in clinical practice, the CT image is often subjected to postprocessing to address such high noise and/or low resolution.

Some existing postprocessing techniques address these issues analytically. More specifically, such existing postprocessing techniques obtain sinograms corresponding to the CT image, apply various noise-controlled and kernel-based reconstruction techniques to the sinograms thereby yielding various filtered versions of the CT image, and then blend such various filtered versions together to form a blended CT image. Although the blended CT image can be of high visual quality, such postprocessing techniques are excessively computationally expensive due to the repetitive application of noise-controlled and kernel-based image reconstruction.

Other existing postprocessing techniques address these issues with machine learning. More specifically, such other existing postprocessing techniques generate a training dataset that contains image pairs, where each image pair includes a given CT image and a corresponding blended CT image, and train a single machine learning model to infer blended CT images from given CT images based on the training dataset. Although such other postprocessing techniques can be less computationally expensive, the inferred blended CT images can exhibit suboptimal image quality due to implementation of a monolithic machine learning architecture with content-based loss function.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate machine learning generation of low-noise and high structural conspicuity images are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various cases, the receiver component can access an image. In various aspects, the computer-executable components can further comprise a preprocessing component. In various cases, the preprocessing component can apply at least one of image denoising or image resolution enhancement to the image, thereby yielding a first intermediary image. In various instances, the computer-executable components can further comprise a kernel synthesis component. In various cases, the kernel synthesis component can generate, via execution of a plurality of machine learning models, a plurality of second intermediary images based on the first intermediary image. In various aspects, a given machine learning model in the plurality of machine learning models can receive as input the first intermediary image, the given machine learning model can produce as output a given second intermediary image in the plurality of second intermediary images, and the given second intermediary image can represent a kernel-transformed version of the first intermediary image. In various instances, the computer-executable components can further comprise a blending component. In various cases, the blending component can generate a blended image based on the plurality of second intermediary images.

According to one or more embodiments, the above-described system can be implemented as a computer-implemented method and/or a computer program product.

DESCRIPTION OF THE DRAWINGS

FIGS. 12-17 illustrate example, non-limiting images associated with and/or generated by various embodiments described herein.

DETAILED DESCRIPTION

Figure 1:
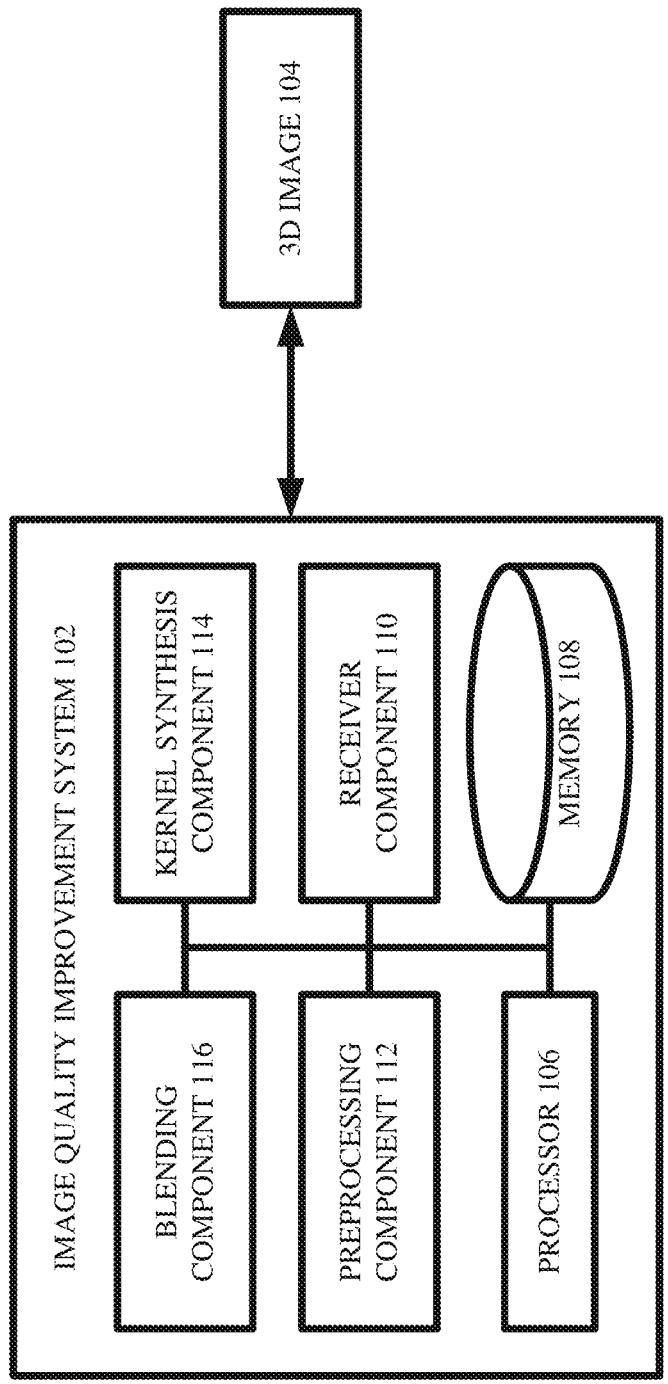
FIG. 1 illustrates a block diagram of an example, non-limiting system that facilitates machine learning generation of low-noise and high structural conspicuity images in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A computed tomography (CT) image (e.g., a three-dimensional voxel array of Hounsfield units that can be constructed from a series of two-dimensional pixel arrays of Hounsfield units) can be captured and/or generated via CT imaging equipment that is set to a given energy and/or dose level (e.g., low energy and/or low dose to prevent a patient from being exposed to excessive radiation) and reconstructed with a desired frequency kernel setting. The choice of which frequency kernel to implement can be decided based on the particular clinical application/context in question and/or based on the particular structure of diagnostic interest. For example, high frequency kernels can result in better structural conspicuity and sharpness which can be useful for bone tissue analysis. However, such high frequency kernels can suffer from high noise and/or loss of contrast in soft tissues. As another example, low frequency kernels can be well-suited for soft tissue analysis and can provide low noise and/or good contrast, but such low frequency kernels can also result in low resolution. Thus, in clinical practice, the CT image can often be subjected to postprocessing to address such high noise and/or low resolution.

Some existing postprocessing techniques address these issues analytically. More specifically, such existing postprocessing techniques obtain sinograms corresponding to the CT image (e.g., two-dimensional slices/projections of the CT image), apply various noise-controlled and kernel-based reconstruction techniques (e.g., model-based iterative reconstruction (MBIR), or adaptive statistical iterative reconstruction (ASIR)) thereby yielding various filtered versions of the CT image (e.g., MBIR and/or ASIR can be implemented with a high frequency kernel so as to yield a bone-filtered CT image that exhibits improved visual quality of depicted bones; MBIR and/or ASIR can be implemented with a low frequency kernel so as to yield a soft-tissue-filtered CT image that exhibits improved visual quality of depicted soft tissue), and then blend (e.g., via adaptive blending and/or feature-guided blending) such various filtered versions together to form a blended CT image. Although the blended CT image can be of high visual quality, such existing postprocessing techniques are excessively computationally expensive due to the repetitive application of MBIR, and/or ASIR.

Other existing postprocessing techniques address these issues with machine learning. In particular, such other existing postprocessing techniques generate a training dataset that contains image pairs, where each image pair includes a given CT image and a corresponding blended CT image (e.g., the corresponding blended CT images can be generated analytically as mentioned above), and by using the training dataset to train a single machine learning model to infer blended CT images from given CT images. Such other existing postprocessing techniques can be less computationally expensive. After all, once trained, the single machine learning model can be deployed and/or executed during inference without requiring any application of MBIR, and/or ASIR. However, the blended CT images generated by such other existing postprocessing techniques can exhibit suboptimal image quality due to implementation of a monolithic machine learning architecture that uses a content-based loss function. In other words, training a single (e.g., monolithic) machine learning model to infer a blended CT image from a given CT image requires that single machine learning model to handle all of the different kernel transformations that are desired as well as the blend transformation that is desired. It can be non-trivial to train one model to learn all of such various contradicting transformations (e.g., denoising and deblurring can be considered as contradictory) when content-based loss functions (e.g., mean absolute error and/or mean squared error) are utilized.

Accordingly, systems and/or techniques that can address one or more of these technical problems can be desirable.

Various embodiments of the subject innovation can address one or more of these technical problems. One or more embodiments described herein include systems, computer-implemented methods, apparatus, and/or computer program products that can facilitate machine learning generation of low-noise and high structural conspicuity images. That is, such one or more embodiments can achieve the advantages of both high frequency kernels (e.g., high resolution, sharpness, and/or structural conspicuity) and low frequency kernels (e.g., low noise), without the disadvantages of either (e.g., without the high noise of high frequency kernels and without the low sharpness/resolution of low frequency kernels). In various aspects, embodiments of the subject innovation can be considered as a computerized tool (e.g., any suitable combination of computer-executable hardware and/or computer-executable software) that can electronically receive a three-dimensional image (e.g., a CT image) and that can electronically produce a visually improved version of the 3D image by executing a multi-tiered machine learning architecture. Because such computerized tool implements machine learning, such computerized tool can be more computationally efficient (e.g., can consume less time and/or fewer computational resources) than existing postprocessing techniques that use wholly analytical approaches. Furthermore, because such computerized tool implements a multi-tiered machine learning architecture as described herein, such computerized tool can produce 3D images with better visual quality than existing postprocessing techniques that use monolithic machine learning architectures.

In various embodiments, the computerized tool described herein can comprise a receiver component, a preprocessing component, a kernel synthesis component, and/or a blending component.

In various embodiments, the receiver component of the computerized tool can electronically receive and/or otherwise electronically access a 3D image. In various aspects, the 3D image can be any suitable three-dimensional array of voxels. For example, the 3D image can be a three-dimensional CT scan that is generated and/or captured by any suitable CT scanner and that depicts one or more anatomical structures of a patient. In various instances, the receiver component can electronically retrieve the 3D image from any suitable centralized and/or decentralized data structure (e.g., graph data structure, relational data structure, hybrid data structure), whether remote from and/or local to the receiver component. In various other instances, the receiver component can electronically retrieve the 3D image from any suitable imaging device and/or imaging equipment that captured and/or generated the 3D image. In any case, the receiver component can electronically obtain and/or access the 3D image, so that other components of the computerized tool can electronically interact with (e.g., read, write, edit, manipulate) the 3D image.

In various embodiments, the preprocessing component of the computerized tool can electronically apply at least one of image denoising and/or image resolution enhancement to the 3D image, thereby yielding a denoised and/or resolution enhanced 3D image. For example, in some cases, the preprocessing component can apply image denoising but not image resolution enhancement to the 3D image. In other cases, the preprocessing component can apply image resolution enhancement but not image denoising to the 3D image. In still other cases, the preprocessing component can apply both image denoising and image resolution enhancement to the 3D image. In situations where the preprocessing component performs both image denoising and image resolution enhancement, any order of application can be used (e.g., the preprocessing component can first apply image denoising and can then apply image resolution enhancement, or the preprocessing component can first apply image resolution enhancement and can then apply image denoising).

In various aspects, the preprocessing component can apply image denoising via any suitable analytical denoising technique (e.g., linear smoothing filters, nonlinear smoothing filters, anisotropic diffusion, non-local means, wavelet transforms, and/or statistical methods). In various other aspects, the preprocessing component can instead apply image denoising via any suitable machine learning technique (e.g., a deep learning neural network can be trained via backpropagation to infer a denoised version of an inputted image). Similarly, in various instances, the preprocessing component can apply image resolution enhancement via any suitable analytical and/or modality-based image resolution enhancement technique (e.g., converting thick slices/projections to thinner slices/projections, implementing non-wobble-to-wobble acquisition, implementing no-comb-to-comb acquisition, and/or implementing computer simulation). In various other instances, the preprocessing component can apply image resolution enhancement via any suitable machine learning technique (e.g., a deep learning neural network can be trained via backpropagation to infer a resolution-enhanced version of an inputted image). In any case, the preprocessing component can electronically generate a denoised and/or resolution enhanced 3D image.

In various embodiments, the kernel synthesis component of the computerized tool can electronically generate, via execution of a plurality of machine learning models, a plurality of kernel-transformed 3D images based on the denoised and/or resolution enhanced 3D image. More specifically, the kernel synthesis component can electronically store, electronically maintain, electronically control, and/or otherwise electronically access a plurality of machine learning models. In various aspects, each of the plurality of machine learning models can exhibit any suitable artificial intelligence architecture. For example, each of the plurality of machine learning models can exhibit a deep learning neural network architecture. In such case, each of the plurality of machine learning models can include any suitable number of layers (e.g., an input layer, one or more hidden layers, an output layer), can include any suitable numbers of neurons in various layers (e.g., different layers can include the same and/or different numbers of neurons as each other), can include any suitable activation functions (e.g., sigmoid, softmax, hyperbolic tangent, rectified linear unit) in various neurons (e.g., different neurons can have the same and/or different activation functions as each other), and/or can include any suitable interneuron connections (e.g., forward connections, skip connections, recursive connections). In various aspects, each of the plurality of machine learning models can be configured to receive as input the denoised and/or resolution enhanced 3D image and to produce as output a frequency-kernel-transformed version (also referred to as a kernel-transformed version) of the denoised and/or resolution enhanced 3D image, where different ones of the plurality of machine learning models can be configured to mimic and/or infer different and/or unique types of frequency kernel transformations.

As a non-limiting example, a first machine learning model in the plurality of machine learning models can be configured to infer a bone-kernel transformation (e.g., bone tissue can be enhanced via a high frequency kernel). In such case, the first machine learning model can receive as input the denoised and/or resolution enhanced 3D image and can produce as output a bone-kernel-transformed 3D image, which can be considered as a version of the denoised and/or resolution enhanced 3D image that exhibits increased structural conspicuity for depicted bone tissue. More specifically, an input layer of the first machine learning model can receive the denoised and/or resolution enhanced 3D image, the denoised and/or resolution enhanced 3D image can complete a forward pass through one or more hidden layers of the first machine learning model, and an output layer of the first machine learning model can compute the bone-kernel-transformed 3D image based on activations provided by the one or more hidden layers of the first machine learning model.

As another non-limiting example, a second machine learning model in the plurality of machine learning models can be configured to infer a lung-kernel transformation (e.g., lung tissue can be enhanced via an intermediate frequency kernel). In such case, the second machine learning model can receive as input the denoised and/or resolution enhanced 3D image and can produce as output a lung-kernel-transformed 3D image, which can be considered as a version of the denoised and/or resolution enhanced 3D image that exhibits increased structural conspicuity for depicted lung tissue. More specifically, an input layer of the second machine learning model can receive the denoised and/or resolution enhanced 3D image, the denoised and/or resolution enhanced 3D image can complete a forward pass through one or more hidden layers of the second machine learning model, and an output layer of the second machine learning model can compute the lung-kernel-transformed 3D image based on activations provided by the one or more hidden layers of the second machine learning model.

As still another non-limiting example, a third machine learning model in the plurality of machine learning models can be configured to infer a soft-tissue-kernel transformation (e.g., soft tissue can be enhanced via a low frequency kernel). In such case, the third machine learning model can receive as input the denoised and/or resolution enhanced 3D image and can produce as output a soft-tissue-kernel-transformed 3D image, which can be considered as a version of the denoised and/or resolution enhanced 3D image that exhibits increased structural conspicuity for depicted soft tissue. More specifically, an input layer of the third machine learning model can receive the denoised and/or resolution enhanced 3D image, the denoised and/or resolution enhanced 3D image can complete a forward pass through one or more hidden layers of the third machine learning model, and an output layer of the third machine learning model can compute the soft-tissue-kernel-transformed 3D image based on activations provided by the one or more hidden layers of the third machine learning model.

Note that each of the plurality of machine learning models can infer a respectively corresponding kernel-transformation based on the denoised and/or resolution enhanced 3D image, without having to implement image reconstruction (e.g., MBIR, ASIR). This is in contrast to analytical techniques, which involve decomposing a desired 3D image into sinograms and applying noise-controlled and kernel-based image reconstruction to the sinograms. Furthermore, note that each of the plurality of machine learning models can infer a single and respectively corresponding type of kernel-transformation. This is contrast to monolithic machine learning techniques, which involve training a single model to infer multiple different types of kernel transformations.

In any case, the kernel synthesis component can electronically execute the plurality of machine learning models on the denoised and/or resolution enhanced 3D image, thereby yielding a plurality of kernel-transformed 3D images, where each kernel-transformed 3D image exhibits improved visual quality of a respectively corresponding tissue type and/or feature type as compared to the denoised and/or resolution enhanced 3D image.

In various embodiments, the blending component of the computerized tool can electronically generate a blended 3D image based on the plurality of kernel-transformed 3D images. In various aspects, the blending component can generate the blended 3D image via any suitable blending technique. For example, the blending component can, in various cases, combine and/or aggregate the plurality of kernel-transformed 3D images together via adaptive blending (e.g., using tissue-based weighting and/or feature-based weighting). As another example, the blending component can, in other cases, generate the blended 3D image via machine learning. More specifically, the blending component can electronically store, maintain, control, and/or otherwise access a blending machine learning model, where such blending machine learning model can be configured to receive as input the plurality of kernel-transformed 3D images and to produce as output the blended 3D image. In various instances, such a blending machine learning model can exhibit any suitable machine learning architecture (e.g., deep learning neural network) and can be trained via backpropagation.

In any case, the blending component can generate the blended 3D image based on the plurality of kernel-transformed 3D images, such that the blended 3D image can be considered as a single image that exhibits improved visual quality across multiple tissue types and/or feature types (e.g., in contrast to the plurality of kernel-transformed 3D images, each of which can exhibit improved visual quality of only one respectively corresponding tissue type and/or feature type).

In order to facilitate the above-described functionalities, the plurality of machine learning models executable by the kernel synthesis component can first require training (e.g., as can any machine learning models implemented by the preprocessing component and/or the blending component). Accordingly, in various embodiments, the computerized tool can comprise a training component, which can electronically train (e.g., via backpropagation) the plurality of machine learning models based on various training data, as explained in more detail herein.

Accordingly, various embodiments described herein can be considered as a computerized tool that can receive a 3D image and that can generate, via a multi-tiered machine learning architecture, a blended 3D image that exhibits improved visual quality as compared to the 3D image. That is, the computerized tool does not generate the blended 3D image by feeding the original 3D image to a single, monolithic machine learning architecture. Instead, the computerized tool generates the blended 3D image by denoising and/or enhancing the resolution of the original 3D image analytically and/or via one or more machine learning models, by executing a plurality of other machine learning models on the denoised and/or resolution enhanced version of the original 3D image to yield a plurality of kernel-transformed 3D images, and by blending the plurality of kernel-transformed 3D images together analytically and/or via a blending machine learning model. In other words, the computerized tool can be considered as implementing a multi-tiered machine learning architecture to generate the blended 3D image. More specifically, the multi-tiered machine learning architecture can include a denoising and/or resolution enhancement model, a plurality of kernel-transformation models, and a blending model. Such different models can be trained independently, so that they can each be considered as mastering their assigned inference task (e.g., inferring denoised version, inferring resolution enhanced version, inferring kernel-transformed version, inferring blended version). In stark contrast, a monolithic machine learning architecture would include only a single model that is trained to perform all of such tasks, and such a single model cannot feasibly be considered as mastering any of such tasks.

In other words, various embodiments described herein can output a low-noise and high-structural-conspicuity CT image based on an inputted noisy CT image. Specifically, the inputted noisy CT image can undergo denoising and/or resolution enhancement, thereby yielding a denoised and/or enhanced CT image. Moreover, a plurality of machine learning models that are trained to infer different frequency kernel transformations can be executed on the denoised and/or enhanced CT image, thereby yielding a plurality of different kernel-transformed CT images. In various cases, each of the plurality of kernel-transformed CT images can be considered as exhibiting good visual quality for a respectively corresponding tissue type. Finally, the plurality of kernel-transformed CT images can be blended together to generate a finalized CT image that exhibits good visual quality across all tissue types.

Various embodiments of the subject innovation can be employed to use hardware and/or software to solve problems that are highly technical in nature (e.g., to facilitate machine learning generation of low-noise and high structural conspicuity images), that are not abstract and that cannot be performed as a set of mental acts by a human. Further, some of the processes performed can be performed by a specialized computer (e.g., deep learning neural networks) for carrying out defined tasks related to machine learning generation of low-noise and high structural conspicuity images. For example, such defined tasks can include: accessing, by a device operatively coupled to a processor, an image; applying, by the device, at least one of image denoising or image resolution enhancement to the image, thereby yielding a first intermediary image; generating, via execution of a plurality of machine learning models, a plurality of second intermediary images based on the first intermediary image, wherein a given machine learning model in the plurality of machine learning models receives as input the first intermediary image, wherein the given machine learning model produces as output a given second intermediary image in the plurality of second intermediary images, and wherein the given second intermediary image represents a kernel-transformed version of the first intermediary image; and generating, by the device, a blended image based on the plurality of second intermediary images.

Such defined tasks are not performed manually by humans. Indeed, neither the human mind nor a human with pen and paper can electronically receive an image (e.g., a CT scan voxel array), electronically apply denoising and/or resolution enhancement to the image, electronically generate multiple kernel-transformed versions of the image by executing multiple trained machine learning models, and electronically blend the multiple kernel-transformed images together. Instead, various embodiments of the subject innovation are inherently and inextricably tied to computer technology and cannot be implemented outside of a computing environment (e.g., deep learning neural networks are specialized pieces of computer hardware and/or software that cannot be implemented without computers; accordingly, a computerized tool that executes various deep learning neural networks to improve the visual quality of an inputted image is likewise a specialized piece of computer hardware and/or software that cannot be implemented in any practical, sensible, and/or reasonable way without computers).

Moreover, various embodiments of the subject innovation can integrate into a practical application various teachings described herein relating to machine learning generation of low-noise and high structural conspicuity images. As explained above, existing techniques utilize wholly analytical methods for improving visual quality or utilize monolithic machine learning architectures for improving visual quality. Wholly analytical methods provide adequate visual quality but consume excessive computational resources (e.g., MBIR and/or ASIR are very computationally intensive). On the other hand, monolithic machine learning architectures consume far fewer computational resources but fail to provide optimal image quality. In stark contrast, various embodiments described herein can be considered as a computerized tool that can address these technical problems. Specifically, the computerized tool can implement a multi-tiered machine learning architecture to generate a blended 3D image based on an inputted 3D image, instead of a monolithic machine learning architecture. In particular, the computerized tool can access the 3D image and can apply denoising and/or image resolution enhancement to the 3D image, thereby yielding a denoised and/or resolution enhanced 3D image (e.g., this can be accomplished analytically and/or via a trained denoising and/or resolution enhancing model). Moreover, the computerized tool can generate a plurality of kernel-transformed 3D images by executing a plurality of trained machine learning models on the denoised and/or resolution enhanced 3D image (e.g., each model can be configured/trained to infer a respectively corresponding kernel transformation). Finally, the computerized tool can generate a blended 3D image by combining and/or aggregating the plurality of kernel-transformed 3D images (e.g., this can be accomplished analytically and/or via a trained blending model).

Because such a computerized tool can utilize machine learning to perform the kernel transformations, the computerized tool can be more computationally efficient than existing analytical techniques (e.g., the computerized tool does not need to implement image reconstruction to generate kernel-transformations). Moreover, because denoising, resolution enhancement, each kernel transformation, and blending can each be handled by a separate and/or devoted machine learning model, such tasks can be individually mastered by their respective models. In contrast, when a single, monolithic model is trained to perform all of such tasks, that single, monolithic model can fail to learn any of such tasks sufficiently well. Accordingly, the multi-tiered machine learning architecture described herein can provide higher visual quality blended images than can existing techniques that utilize monolithic machine learning architectures, while simultaneously consuming fewer computational resources than existing techniques that utilize wholly analytical methods. Thus, the computerized tool described herein provides a concrete and tangible technical benefit in the field of machine learning, and certainly constitutes a useful and practical application of computers.

Furthermore, various embodiments of the subject innovation can control real-world tangible devices based on the disclosed teachings. For example, various embodiments of the subject innovation can electronically improve visual quality of real-world 3D images (e.g., CT scans) by executing real-world deep learning neural networks, and can electronically render such improved 3D images on real-world computer displays, screens, and/or monitors.

It should be appreciated that the herein figures and description provide non-limiting examples of the subject innovation and are not necessarily drawn to scale.

FIG. 1 illustrates a block diagram of an example, non-limiting system 100 that can facilitate machine learning generation of low-noise and high structural conspicuity images in accordance with one or more embodiments described herein. As shown, an image quality improvement system 102 can be electronically integrated, via any suitable wired and/or wireless electronic connections, with a 3D image 104.

In various aspects, the 3D image 104 can be any suitable three-dimensional array of voxels. As a non-limiting example, the 3D image 104 can be a three-dimensional CT image that is reconstructed from CT projections and that depicts one or more anatomical structures (e.g., that depicts bone tissue, lung tissue, soft tissue). As another non-limiting example, the 3D image 104 can be any other suitable type of three-dimensional medical image (e.g., a three-dimensional array of Hounsfield units) that depicts one or more anatomical structures, such as a three-dimensional magnetic resonance imaging (MRI) image, a three-dimensional X-ray image, a three-dimensional ultrasound image, and/or a three-dimensional positron emission tomography (PET) image. In various instances, the 3D image 104 can be captured and/or generated by any suitable imaging equipment (not shown), such as a CT scanner, an MRI scanner, an X-ray scanner, an ultrasound scanner, and/or a PET scanner.

In various aspects, the 3D image 104 can exhibit an insufficient level of visual quality. For example, the 3D image 104 can exhibit image noise and/or image blurring, which can be caused by a low power, low radiation, detector size, and/or low frequency setting of the imaging equipment that captured/generated by the 3D image 104. In any case, it can be desired to improve the level of visual quality of the 3D image 104. In various instances, the image quality improvement system 102 can facilitate such improvement, as described herein.

In various embodiments, the image quality improvement system 102 can comprise a processor 106 (e.g., computer processing unit, microprocessor) and a computer-readable memory 108 that is operably and/or operatively and/or communicatively connected/coupled to the processor 106. The computer-readable memory 108 can store computer-executable instructions which, upon execution by the processor 106, can cause the processor 106 and/or other components of the image quality improvement system 102 (e.g., receiver component 110, preprocessing component 112, kernel synthesis component 114, blending component 116) to perform one or more acts. In various embodiments, the computer-readable memory 108 can store computer-executable components (e.g., receiver component 110, preprocessing component 112, kernel synthesis component 114, blending component 116), and the processor 106 can execute the computer-executable components.

In various embodiments, the image quality improvement system 102 can comprise a receiver component 110. In various aspects, the receiver component 110 can electronically receive and/or otherwise electronically access the 3D image 104. In various instances, the receiver component 110 can electronically retrieve the 3D image 104 from any suitable centralized and/or decentralized database (not shown) and/or computing device (not shown). In various other instances, the receiver component 110 can electronically retrieve the 3D image 104 from the imaging equipment that captured and/or generated the 3D image 104. In any case, the receiver component 110 can electronically obtain and/or access the 3D image 104, so that other components of the image quality improvement system 102 can electronically interact with the 3D image 104.

In various embodiments, the image quality improvement system 102 can comprise a preprocessing component 112. In various aspects, as described herein, the preprocessing component 112 can electronically apply image denoising to the 3D image 104 and/or can electronically apply image resolution enhancement to the 3D image 104, thereby yielding a denoised and/or resolution enhanced 3D image.

In various embodiments, the image quality improvement system 102 can comprise a kernel synthesis component 114. In various instances, as described herein, the kernel synthesis component 114 can electronically execute a plurality of machine learning models on the denoised and/or resolution enhanced 3D image, thereby yielding a plurality of kernel-transformed 3D images. In various cases, as described herein, each of the plurality of machine learning models can be configured and/or trained to infer a respectively corresponding and/or unique kernel-transformation of an inputted 3D image. Moreover, in various aspects, as described herein, each of the plurality of kernel-transformed 3D images can be considered as a version of the denoised and/or resolution enhanced 3D image that exhibits improved visual quality of a respectively corresponding feature type and/or tissue type.

In various embodiments, the image quality improvement system 102 can comprise a blending component 116. In various cases, as described herein, the blending component 116 can electronically generate a blended 3D image by combining and/or aggregating the plurality of kernel-transformed 3D images. In various aspects, the blended 3D image can be considered as a version of the original 3D image that exhibits improved visual quality of multiple features and/or tissue types.

In various embodiments, the image quality improvement system 102 can electronically transmit the blended 3D image to any suitable computing device as desired. In various other embodiments, the image quality improvement system 102 can electronically render the blended 3D image on any suitable computerized display, screen, and/or monitor as desired.

Figure 2:
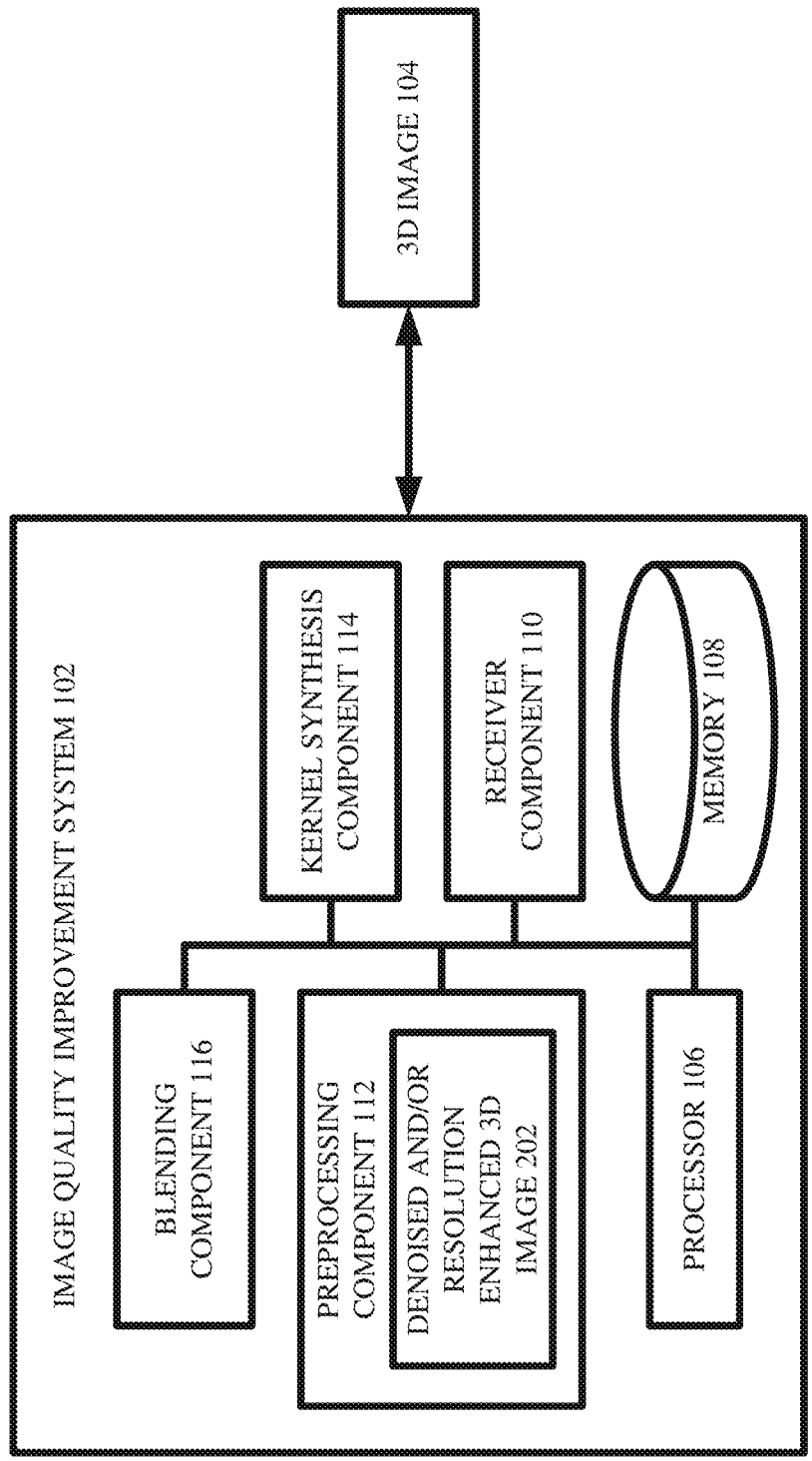
FIG. 2 illustrates a block diagram of an example, non-limiting system including a denoised and/or resolution enhanced 3D image that facilitates machine learning generation of low-noise and high structural conspicuity images in accordance with one or more embodiments described herein.

FIG. 2 illustrates a block diagram of an example, non-limiting system 200 including a denoised and/or resolution enhanced 3D image that can facilitate machine learning generation of low-noise and high structural conspicuity images in accordance with one or more embodiments described herein. As shown, the system 200 can, in some cases, comprise the same components as the system 100, and can further comprise a denoised and/or resolution enhanced 3D image 202.

In various embodiments, the preprocessing component 112 can electronically generate the denoised and/or resolution enhanced 3D image 202 based on the 3D image 104. More specifically, the preprocessing component 112 can electronically apply image denoising techniques to the 3D image 104 and/or can electronically apply image resolution enhancement techniques to the 3D image 104, and the result can be the denoised and/or resolution enhanced 3D image 202. Accordingly, the denoised and/or resolution enhanced 3D image 202 can be considered as a version of the 3D image 104 that exhibits less visual noise than the 3D image 104 and/or that exhibits higher visual resolution than the 3D image 104. This is explained in more detail with respect to FIG. 3.

Figure 3:
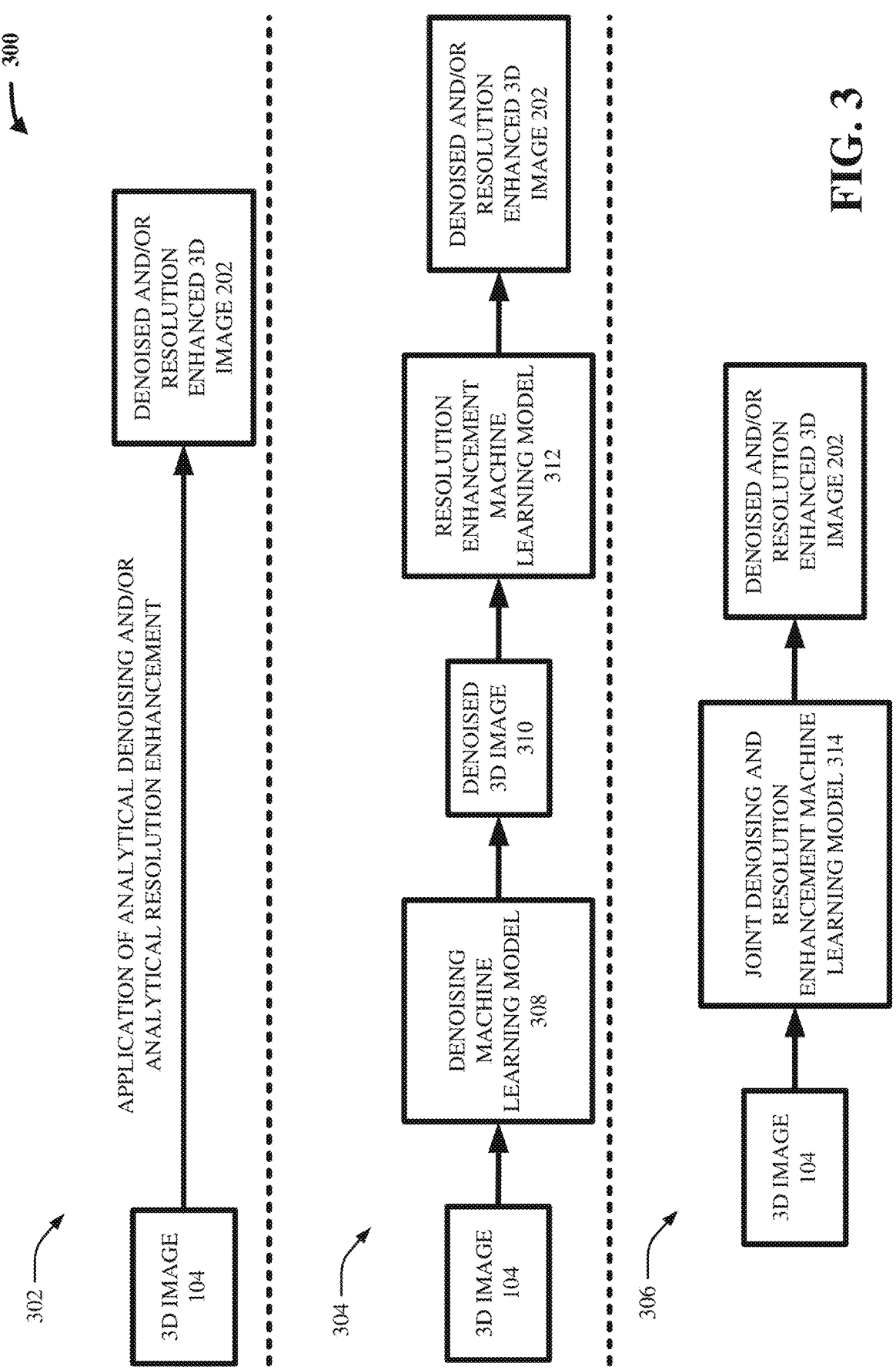
FIG. 3 illustrates an example, non-limiting block diagram showing how a denoised and/or resolution enhanced 3D image can be generated in accordance with one or more embodiments described herein.

FIG. 3 illustrates an example, non-limiting block diagram 300 showing how the denoised and/or resolution enhanced 3D image 202 can be generated in accordance with one or more embodiments described herein.

As shown, FIG. 3 depicts a scenario 302, a scenario 304, and a scenario 306. These three different scenarios help to show how the preprocessing component 112 can generate the denoised and/or resolution enhanced 3D image 202 based on the 3D image 104.

First, consider the scenario 302. As shown in the scenario 302, the preprocessing component 112 can generate the denoised and/or resolution enhanced 3D image 202 by applying analytical denoising and/or analytical resolution enhancement to the 3D image 104. In various aspects, any suitable analytical denoising technique can be implemented by the preprocessing component 112, such as linear smoothing filters, nonlinear smoothing filters, anisotropic diffusion, non-local means, wavelet transforms, and/or statistical methods. Likewise, in various instances, any suitable analytical resolution enhancement technique can be implemented by the preprocessing component 112, such as converting thick slices/projections to thinner slices/projections, implementing nonwobble-to—wobble acquisition, implementing no-comb-to-comb acquisition, and/or implementing computer simulation.

Next, consider the scenario 304. As shown in the scenario 304, the preprocessing component 112 can generate the denoised and/or resolution enhanced 3D image 202 by implementing a cascaded series of machine learning models. More specifically, in various aspects, the preprocessing component 112 can electronically store, electronically maintain, electronically control, and/or otherwise electronically access a denoising machine learning model 308 and/or a resolution enhancement machine learning model 312.

In various instances, the denoising machine learning model 308 can exhibit any suitable machine learning architecture. For example, the denoising machine learning model 308 can exhibit a deep learning neural network architecture (e.g., the denoising machine learning model 308 can have any suitable number of layers, any suitable numbers of neurons in various layers, any suitable activation functions in various neurons, and/or any suitable interneuron connections). In any case, the denoising machine learning model 308 can be configured to receive as input the 3D image 104 and to produce as output a denoised 3D image 310, where the denoised 3D image 310 can be considered as a version of the 3D image 104 that exhibits less visual noise than the 3D image 104. More specifically, the preprocessing component 112 can feed the 3D image 104 to an input layer of the denoising machine learning model 308, the 3D image 104 can complete a forward pass through one or more hidden layers of the denoising machine learning model 308, and an output layer of the denoising machine learning model 308 can compute the denoised 3D image 310 based on activations provided by the one or more hidden layers of the denoising machine learning model 308.

Those having ordinary skill in the art will appreciate that the denoising machine learning model 308 can be trained in any suitable fashion so as to facilitate its functionality. For example, in some cases, there can be a denoising training dataset that includes a set of training 3D images and a set of denoised annotations that respectively correspond to the set of training 3D images. That is, each given training 3D image in the set of training 3D images can correspond to a given denoised annotation in the set of denoised annotations, where the given denoised annotation can be considered as a ground-truth image that represents how the given training 3D image is supposed to look after denoising is accurately applied to the given training 3D image. In various cases, the set of denoised annotations can be generated in any suitable fashion (e.g., via analytical denoising).

Now, in various cases, the internal parameters (e.g., weights, biases) of the denoising machine learning model 308 can be randomly initialized. For each training 3D image and corresponding denoised annotation in the denoising training dataset, the denoising machine learning model 308 can receive the training 3D image as input and can generate some output based on the training 3D image. In various instances, the output can be considered as an estimated denoised version of the training 3D image, whereas the denoised annotation can be considered a ground-truth denoised version of the training 3D image. Note that, if the denoising machine learning model 308 has so far undergone no and/or little training, the output can be highly inaccurate (e.g., can be very different from the denoised annotation). In any case, an error/loss (e.g., cross-entropy) can be computed between the output and the denoised annotation, and the internal parameters of the denoising machine learning model 308 can be updated via backpropagation that is driven by the computed error/loss. When this training is performed for each training 3D image in the denoising training dataset, the ultimate result can be that the internal parameters of the denoising machine learning model 308 become iteratively optimized for inferring denoised versions of inputted 3D images. Those having ordinary skill in the art will appreciate that any suitable training batch sizes, any suitable training termination criteria, and/or any suitable error/loss functions can be implemented.

In various aspects, the resolution enhancement machine learning model 312 can exhibit any suitable machine learning architecture. For example, the resolution enhancement machine learning model 312 can exhibit a deep learning neural network architecture (e.g., the resolution enhancement machine learning model 312 can have any suitable number of layers, any suitable numbers of neurons in various layers, any suitable activation functions in various neurons, and/or any suitable interneuron connections). In any case, the resolution enhancement machine learning model 312 can be configured to receive as input the denoised 3D image 310 and to produce as output the denoised and/or resolution enhanced 3D image 202, where the denoised and/or resolution enhanced 3D image 202 can be considered as a version of the denoised 3D image 310 that exhibits higher visual resolution than the denoised 3D image 310. More specifically, the preprocessing component 112 can feed the denoised 3D image 310 to an input layer of the resolution enhancement machine learning model 312, the denoised 3D image 310 can complete a forward pass through one or more hidden layers of the resolution enhancement machine learning model 312, and an output layer of the resolution enhancement machine learning model 312 can compute the denoised and/or resolution enhanced 3D image 202 based on activations provided by the one or more hidden layers of the resolution enhancement machine learning model 312.

Those having ordinary skill in the art will appreciate that the resolution enhancement machine learning model 312 can be trained in any suitable fashion so as to facilitate its functionality. For example, in some cases, there can be a resolution enhancement training dataset that includes a set of training 3D images and a set of enhanced annotations that respectively correspond to the set of training 3D images. That is, each given training 3D image in the set of training 3D images can correspond to a given enhanced annotation in the set of enhanced annotations, where the given enhanced annotation can be considered as a ground-truth image that represents how the given training 3D image is supposed to look after resolution enhancement is accurately applied to the given training 3D image. In various cases, the set of enhanced annotations can be generated in any suitable fashion (e.g., via acquisition by a super-high resolution imaging system, via thick slice/projection to thin slice/projection, via non wobble-to-wobble acquisition, via no-comb-to-comb acquisition, and/or via no-resolution-recovery-to-resolution-recovery reconstruction).

In various cases, the internal parameters (e.g., weights, biases) of the resolution enhancement machine learning model 312 can be randomly initialized. For each training 3D image and corresponding enhanced annotation in the resolution enhancement training dataset, the resolution enhancement machine learning model 312 can receive the training 3D image as input and can generate some output based on the training 3D image. In various instances, the output can be considered as an estimated resolution enhanced version of the training 3D image, whereas the enhanced annotation can be considered a ground-truth resolution enhanced version of the training 3D image. Note that, if the resolution enhancement machine learning model 312 has so far undergone no and/or little training, the output can be highly inaccurate (e.g., can be very different from the enhanced annotation). In any case, an error/loss (e.g., cross-entropy) can be computed between the output and the enhanced annotation, and the internal parameters of the resolution enhancement machine learning model 312 can be updated via backpropagation that is driven by the computed error/loss. When this training is performed for each training 3D image in the resolution enhancement training dataset, the ultimate result can be that the internal parameters of the resolution enhancement machine learning model 312 become iteratively optimized for inferring resolution enhanced versions of inputted 3D images. Those having ordinary skill in the art will appreciate that any suitable training batch sizes, any suitable training termination criteria, and/or any suitable error/loss functions can be implemented.

Although the scenario 304 depicts the 3D image 104 as being first analyzed by the denoising machine learning model 308 and then by the resolution enhancement machine learning model 312, this is a mere non-limiting example. In various other embodiments, the resolution enhancement machine learning model 312 can be applied first and the denoising machine learning model 308 can be applied second (e.g., the resolution enhancement machine learning model 312 can receive the 3D image 104 and can produce a resolution enhanced 3D image (not shown), and the denoising machine learning model 308 can receive the resolution enhanced 3D image and can produce the denoised and/or resolution enhanced 3D image 202).

Finally, consider the scenario 306. As shown in the scenario 306, the preprocessing component 112 can generate the denoised and/or resolution enhanced 3D image 202 by implementing a joint denoising and resolution enhancement machine learning model 314. In various instances, the joint denoising and resolution enhancement machine learning model 314 can exhibit any suitable machine learning architecture. For example, the joint denoising and resolution enhancement machine learning model 314 can exhibit a deep learning neural network architecture (e.g., can have any suitable number of layers, any suitable numbers of neurons in various layers, any suitable activation functions in various neurons, and/or any suitable interneuron connections). In any case, the joint denoising and resolution enhancement machine learning model 314 can be configured to receive as input the 3D image 104 and to produce as output the denoised and/or resolution enhanced 3D image 202, where the denoised and/or resolution enhanced 3D image 202 can be considered as a version of the 3D image 104 that exhibits less visual noise and more visual resolution than the 3D image 104. More specifically, the preprocessing component 112 can feed the 3D image 104 to an input layer of the joint denoising and resolution enhancement machine learning model 314, the 3D image 104 can complete a forward pass through one or more hidden layers of the joint denoising and resolution enhancement machine learning model 314, and an output layer of the joint denoising and resolution enhancement machine learning model 314 can compute the denoised and/or resolution enhanced 3D image 202 based on activations provided by the one or more hidden layers of the joint denoising and resolution enhancement machine learning model 314.

Those having ordinary skill in the art will appreciate that the joint denoising and resolution enhancement machine learning model 314 can be trained in any suitable fashion so as to facilitate its functionality. For example, in some cases, there can be a training dataset that includes a set of training 3D images and a set of annotations that respectively correspond to the set of training 3D images. That is, each given training 3D image in the set of training 3D images can correspond to a given annotation in the set of annotations, where the given annotation can be considered as a ground-truth image that represents how the given 3D image is supposed to look after both denoising and resolution enhancement are accurately applied to the given 3D image. In various cases, the set of annotations can be generated in any suitable fashion (e.g., via analytical denoising and analytical resolution enhancement; via analytical denoising and modality-based resolution enhancement such as super-high resolution acquisition, no-wobble-to-wobble acquisition, no-comb-to-comb acquisition).

In various cases, the internal parameters (e.g., weights, biases) of the joint denoising and resolution enhancement machine learning model 314 can be randomly initialized. For each training 3D image and corresponding annotation in the training dataset, the joint denoising and resolution enhancement machine learning model 314 can receive the training 3D image as input and can generate some output based on the training 3D image. In various instances, the output can be considered as an estimated denoised and resolution enhanced version of the training 3D image, whereas the annotation can be considered a ground-truth denoised and resolution enhanced version of the training 3D image. Note that, if the joint denoising and resolution enhancement machine learning model 314 has so far undergone no and/or little training, the output can be highly inaccurate (e.g., can be very different from the annotation). In any case, an error/loss (e.g., cross-entropy) can be computed between the output and the annotation, and the internal parameters of the joint denoising and resolution enhancement machine learning model 314 can be updated via backpropagation that is driven by the computed error/loss. When this training is performed for each training 3D image in the training dataset, the ultimate result can be that the internal parameters of the joint denoising and resolution enhancement machine learning model 314 become iteratively optimized for inferring denoised and resolution enhanced versions of inputted 3D images. Those having ordinary skill in the art will appreciate that any suitable training batch sizes, any suitable training termination criteria, and/or any suitable error/loss functions can be implemented.

In any case, the preprocessing component 112 can electronically generate the denoised and/or resolution enhanced 3D image 202 based on the 3D image 104.

Figure 4:
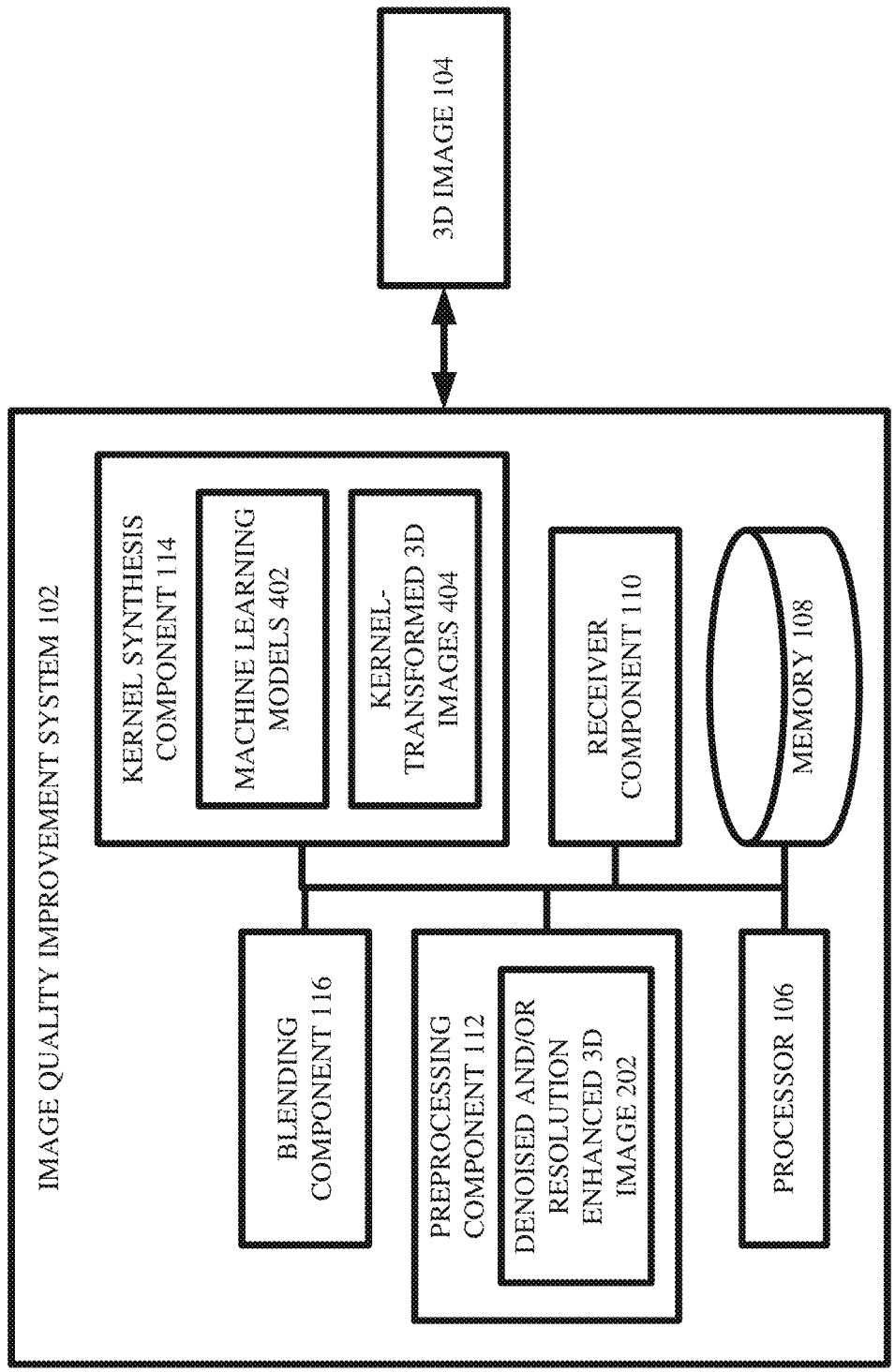
FIG. 4 illustrates a block diagram of an example, non-limiting system including a set of machine learning models and a set of kernel-transformed 3D images that facilitates machine learning generation of low-noise and high structural conspicuity images in accordance with one or more embodiments described herein.

FIG. 4 illustrates a block diagram of an example, non-limiting system 400 including a set of machine learning models and a set of kernel-transformed 3D images that can facilitate machine learning generation of low-noise and high structural conspicuity images in accordance with one or more embodiments described herein. As shown, the system 400 can, in some cases, comprise the same components as the system 200, and can further comprise a set of machine learning models 402 and a set of kernel-transformed 3D images 404.

In various embodiments, the kernel synthesis component 114 can electronically generate the set of kernel-transformed 3D images 404 based on the denoised and/or resolution enhanced 3D image 202. More specifically, the kernel synthesis component 114 can electronically store, electronically maintain, electronically control, and/or otherwise electronically access the set of machine learning models 402, and the kernel synthesis component 114 can electronically execute the set of machine learning models 402 on the denoised and/or resolution enhanced 3D image 202, thereby yielding the set of kernel-transformed 3D images 404. This is explained in more detail with respect to FIG. 5.

Figure 5:
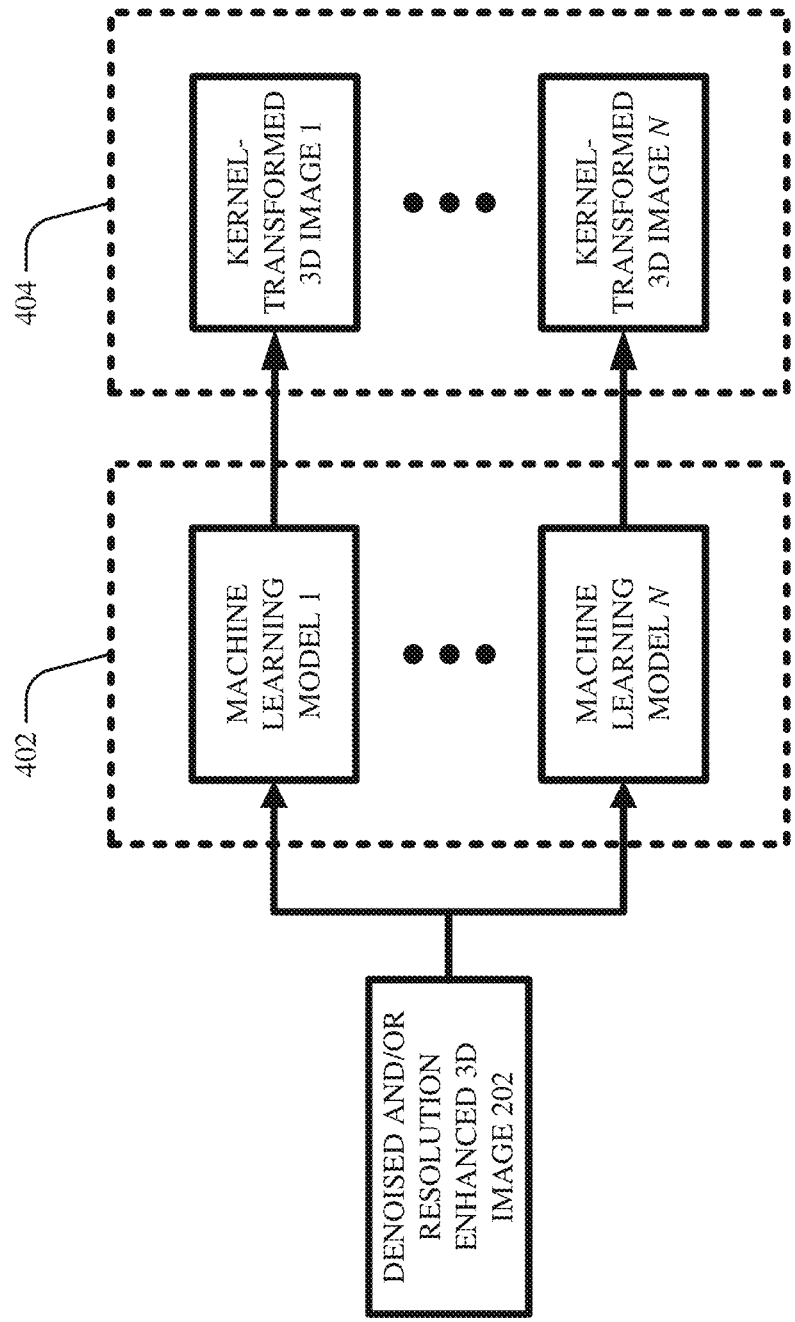
FIG. 5 illustrates an example, non-limiting block diagram showing how a set of machine learning models can generate a set of kernel-transformed 3D images in accordance with one or more embodiments described herein.

FIG. 5 illustrates an example, non-limiting block diagram 500 showing how the set of machine learning models 402 can generate the set of kernel-transformed 3D images 404 in accordance with one or more embodiments described herein.

In various embodiments, as shown, the set of machine learning models 402 can include n models, for any suitable positive integer n: a machine learning model 1 to a machine learning model n. In some cases, n can be greater than or equal to 2. In various aspects, as also shown, the set of kernel-transformed 3D images 404 can respectively correspond to the set of machine learning models 402 (e.g., there can be one kernel-transformed 3D image for each of the set of machine learning models 402). Accordingly, the set of kernel-transformed 3D images 404 can include n images: a kernel-transformed 3D image 1 to a kernel-transformed 3D image n.

In various aspects, each of the set of machine learning models 402 can exhibit any suitable artificial intelligence architecture. For example, each of the set of machine learning models 402 can exhibit a deep learning neural network architecture. In such case, each of the set of machine learning models 402 can have any suitable number of layers, any suitable numbers of neurons in various layers, any suitable activation functions in various neurons, and/or any suitable interneuron connections. In various instances, different ones of the set of machine learning models 402 can have the same and/or different architectures as each other (e.g., the machine learning model 1 can have the same and/or different layers, neurons, activation functions, and/or interneuron connections as the machine learning model n).

In any case, each of the set of machine learning models 402 can be configured to perform a unique type of kernel transformation on an inputted 3D image so as to improve the structural conspicuity of a unique type of feature of that inputted 3D image. Accordingly, each of the set of machine learning models 402 can be configured to receive as input the denoised and/or resolution enhanced 3D image 202 and to produce as output a respectively corresponding one of the set of kernel-transformed 3D images 404.

As an example, the machine learning model 1 can be configured to perform a first type of kernel-transformation that enhances the structural conspicuity of a first type of image feature (e.g., that improves the conspicuity of depicted bone tissue). Accordingly, in various instances, the kernel synthesis component 114 can feed the denoised and/or resolution enhanced 3D image 202 to the machine learning model 1, which can cause the machine learning model 1 to generate as output the kernel-transformed 3D image 1. More specifically, the denoised and/or resolution enhanced 3D image 202 can be received by an input layer of the machine learning model 1, the denoised and/or resolution enhanced 3D image 202 can compete a forward pass through one or more hidden layers of the machine learning model 1, and an output layer of the machine learning model 1 can compute the kernel-transformed 3D image 1 based on activations provided by the one or more hidden layers of the machine learning model 1. In any case, the kernel transformed 3D image 1 can be considered as a version of the denoised and/or resolution enhanced 3D image 202 that exhibits improved structural conspicuity of the first type of image feature (e.g., if the machine learning model 1 is configured to mimic a bone-kernel transformation, then the kernel-transformed 3D image 1 can depict bone tissue with improved structural conspicuity as compared to the denoised and/or resolution enhanced 3D image 202). Note, however, that the kernel-transformed 3D image 1 can depict other types of image features (e.g., lung tissue, soft tissue) with a same and/or similar level of structural conspicuity as compared to the denoised and/or resolution enhanced 3D image 202. Note, moreover, that the machine learning model 1 can generate the kernel-transformed 3D image 1 without implementing the computationally-expensive process of image reconstruction (e.g., the machine learning model 1 can infer the kernel-transformed 3D image 1 based on the denoised and/or resolution enhanced 3D image 202; the machine learning model 1 does not decompose the denoised and/or resolution enhanced 3D image 202 into sinograms and apply MBIR and/or ASIR to the sinograms).

As another example, the machine learning model n can be configured to perform a different type of kernel-transformation that enhances the structural conspicuity of a different type of image feature (e.g., that improves the conspicuity of depicted lung tissue). Accordingly, in various instances, the kernel synthesis component 114 can feed the denoised and/or resolution enhanced 3D image 202 to the machine learning model n, which can cause the machine learning model n to generate as output the kernel-transformed 3D image n. More specifically, the denoised and/or resolution enhanced 3D image 202 can be received by an input layer of the machine learning model n, the denoised and/or resolution enhanced 3D image 202 can compete a forward pass through one or more hidden layers of the machine learning model n, and an output layer of the machine learning model n can compute the kernel-transformed 3D image n based on activations provided by the one or more hidden layers of the machine learning model n. In any case, the kernel transformed 3D image n can be considered as a version of the denoised and/or resolution enhanced 3D image 202 that exhibits improved structural conspicuity of the different type of image feature (e.g., if the machine learning model n is configured to mimic a lung-kernel transformation, then the kernel-transformed 3D image n can depict lung tissue with improved structural conspicuity as compared to the denoised and/or resolution enhanced 3D image 202). Note, however, that the kernel-transformed 3D image n can depict other types of image features (e.g., bone tissue, soft tissue) with a same and/or similar level of structural conspicuity as compared to the denoised and/or resolution enhanced 3D image 202. Note, moreover, that the machine learning model n can generate the kernel-transformed 3D image n without implementing the computationally-expensive process of noise-controlled and kernel-based image reconstruction (e.g., the machine learning model n can infer the kernel-transformed 3D image n based on the denoised and/or resolution enhanced 3D image 202; the machine learning model n does not decompose the denoised and/or resolution enhanced 3D image 202 into sinograms and apply MBIR and/or ASIR to the sinograms).

In any case, the kernel synthesis component 114 can electronically generate the set of kernel-transformed 3D images 404 by executing the set of machine learning models 402 on the denoised and/or resolution enhanced 3D image 202.

In order to facilitate such functionality, the set of machine learning models 402 must first be trained. Such training is described with respect to FIGS. 9-11.

Although the herein disclosure mainly describes embodiments in which the kernel synthesis component 114 generates the set of kernel-transformed 3D images 404 by executing the set of machine learning models 402 on the denoised and/or resolution enhanced 3D image 202, this is a mere non-limiting example. In some cases, the kernel synthesis component 114 can apply analytical kernel-transformations to the denoised and/or resolution enhanced 3D image 202 to generate the set of kernel-transformed 3D images 404 (e.g., the kernel synthesis component 114 can, in some cases, decompose the denoised and/or resolution enhanced 3D image 202 into sinograms, can convolve the sinograms with various convolutional frequency kernels, and can reconstruct each of the set of kernel-transformed 3D images 404 based on the convolved sinograms via computationally inexpensive filtered backprojection (FBP)).

Figure 6:
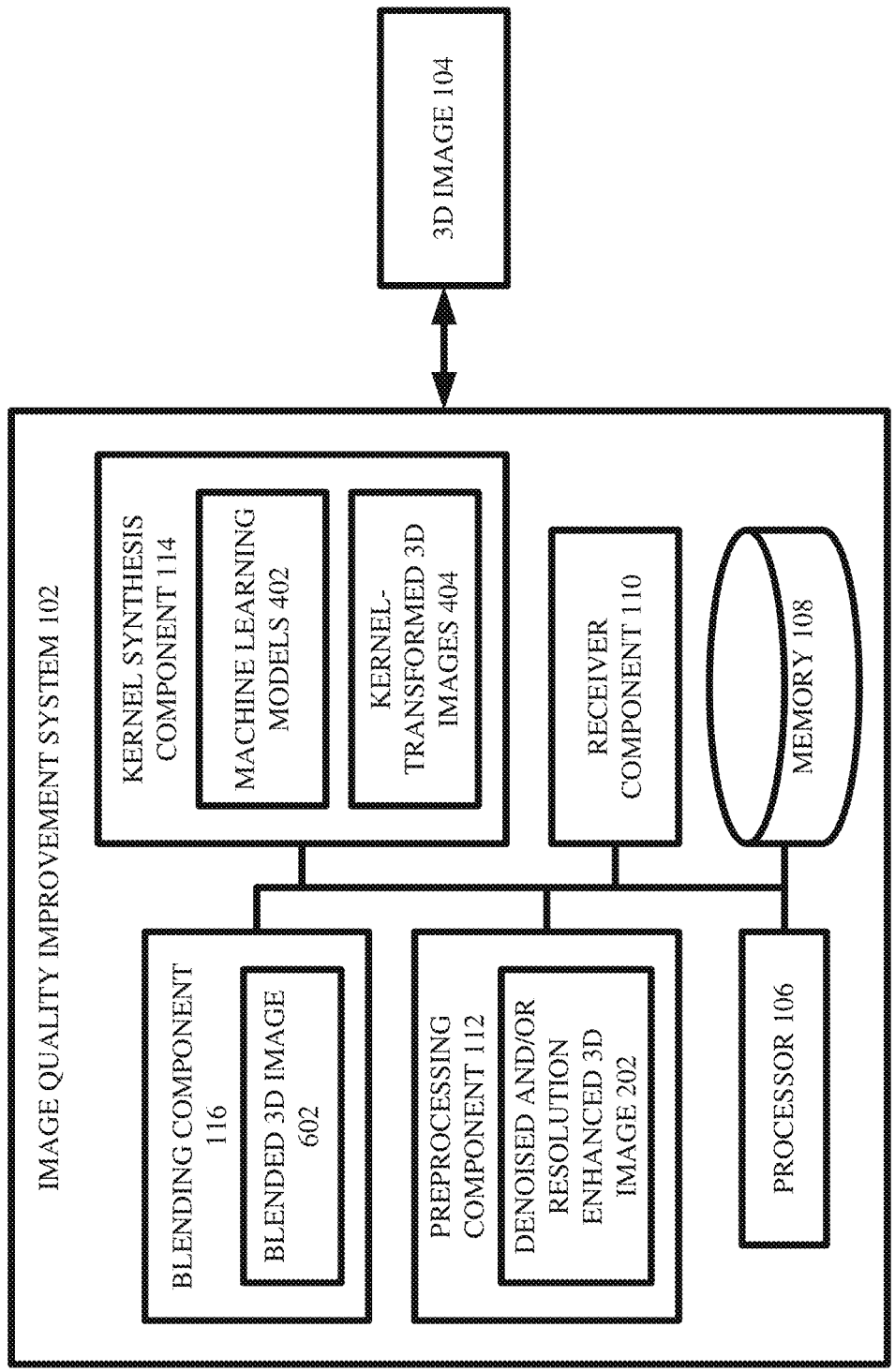
FIG. 6 illustrates a block diagram of an example, non-limiting system including a blended 3D image that facilitates machine learning generation of low-noise and high structural conspicuity images in accordance with one or more embodiments described herein.

FIG. 6 illustrates a block diagram of an example, non-limiting system 600 including a blended 3D image that can facilitate machine learning generation of low-noise and high structural conspicuity images in accordance with one or more embodiments described herein. As shown, the system 600 can, in some cases, comprise the same components as the system 400, and can further comprise a blended 3D image 602.

In various embodiments, the blending component 116 can electronically generate the blended 3D image 602 based on the set of kernel-transformed 3D images 404. In some cases, the blending component 116 can accomplish this via adaptive blending. In other cases, the blending component 116 can accomplish this via machine learning. This is explained in more detail with respect to FIGS. 7-8.

Figure 7:
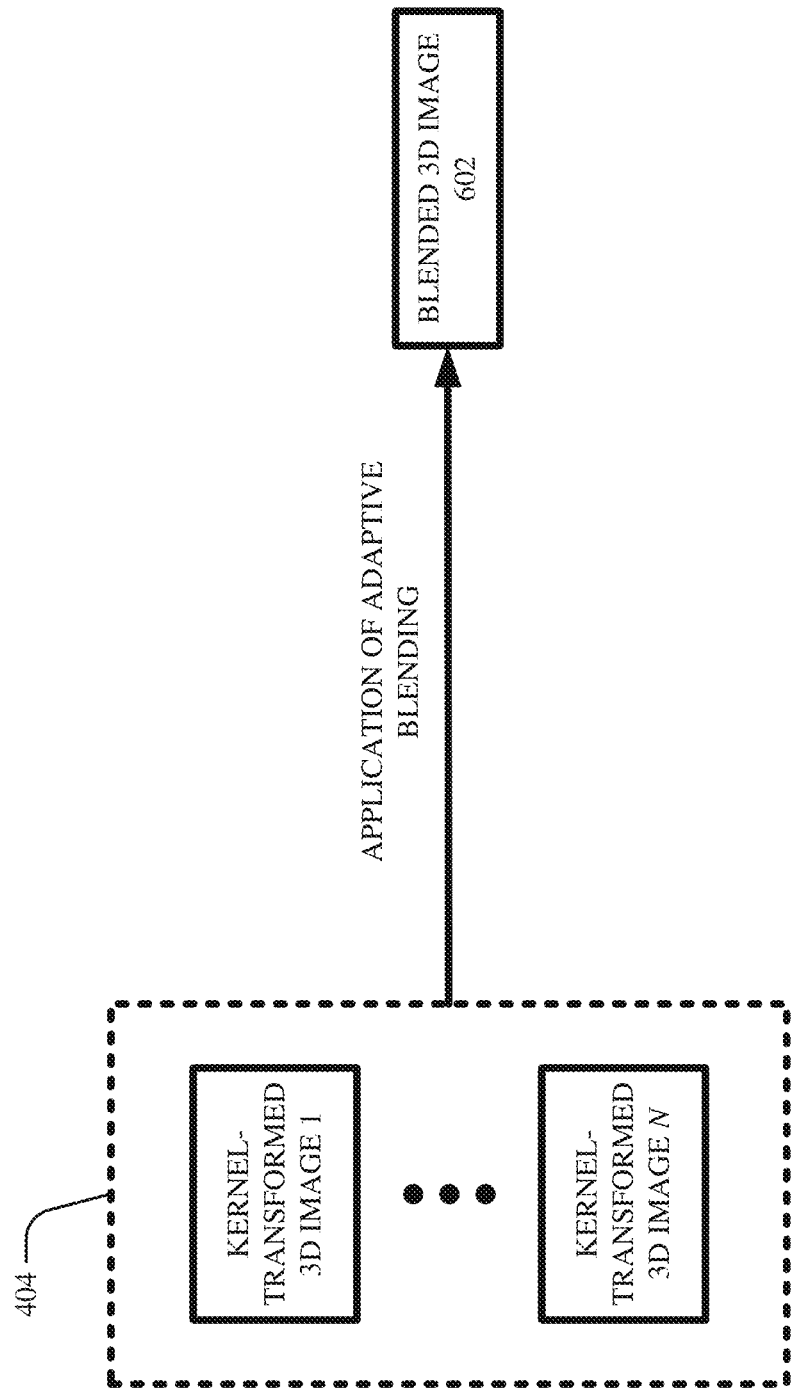
FIGS. 7-8 illustrate non-limiting example block diagrams showing how a blended 3D image can be generated in accordance with one or more embodiments described herein.
Figure 8:
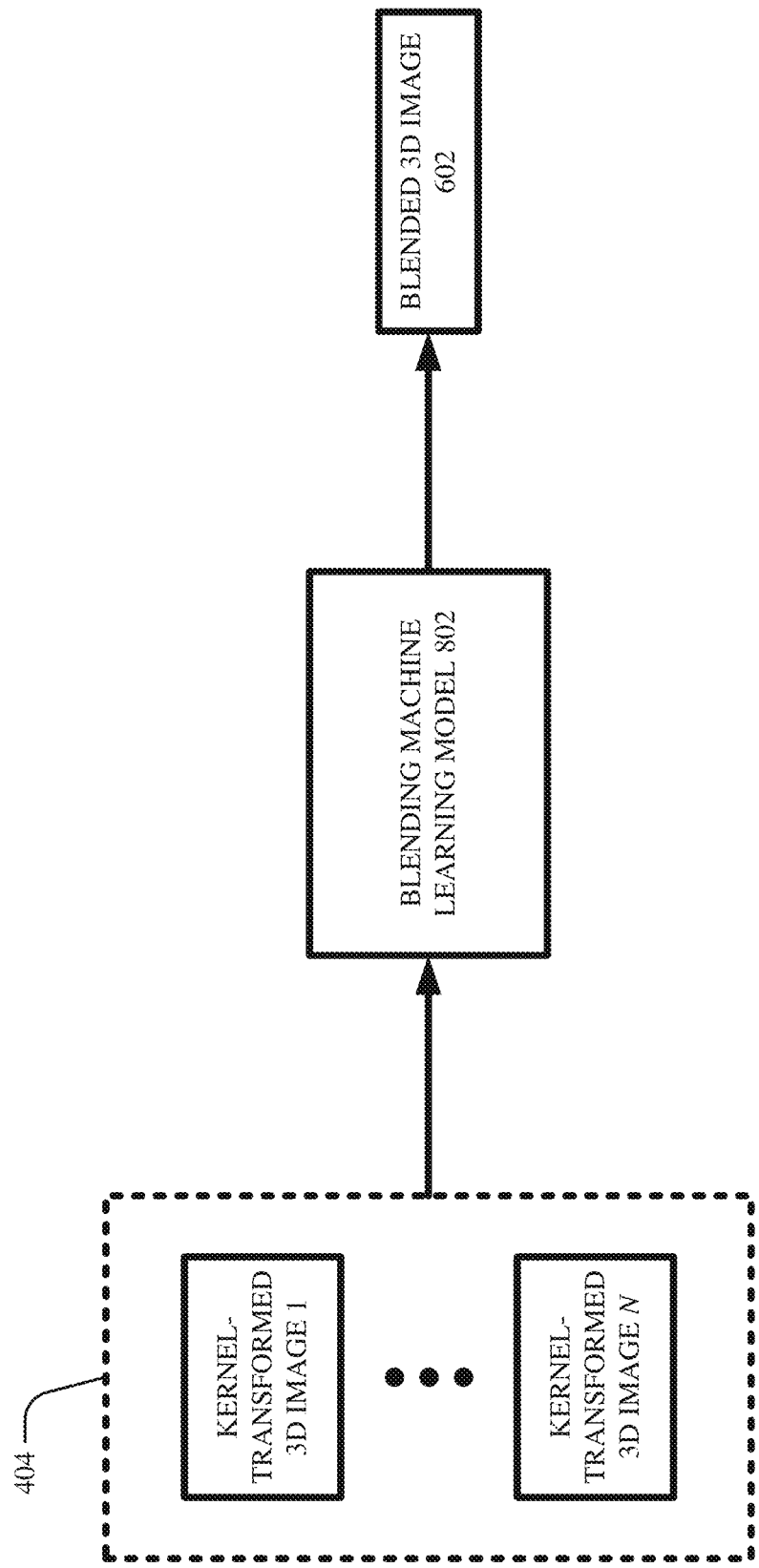

FIGS. 7-8 illustrate non-limiting example block diagrams 700 and 800 showing how the blended 3D image 602 can be generated in accordance with one or more embodiments described herein.

First, consider FIG. 7. As shown in FIG. 7, the blending component 116 can apply adaptive blending to the set of kernel-transformed 3D images 404, thereby yielding the blended 3D image 602. In other instances, the blending component 116 can apply any other suitable analytical blending technique (e.g., weighted linear combination) to the set of kernel-transformed 3D images 404, with the result being the blended 3D image 602. In any case, the blended 3D image 602 can be considered as a combination and/or aggregation of the set of kernel-transformed 3D images 404. Accordingly, because each of the set of kernel-transformed 3D images 404 can exhibit improved structural conspicuity for a respectively corresponding type of image feature (e.g., improved conspicuity for bone tissue or lung tissue or soft tissue), the blended 3D image 602 can be considered as a version of the 3D image 104 (and/or as a version of the denoised and/or resolution enhanced 3D image 202) that exhibits improved structural conspicuity across multiple types of image features (e.g., improved conspicuity for bone tissue and lung tissue and soft tissue). In other words, the blended 3D image 602 can be considered as illustrating and/or depicting the best image features from all of the set of kernel-transformed 3D images 404.

Now, consider FIG. 8. As shown in FIG. 8, the blending component 116 can, in some cases, electronically store, electronically maintain, electronically control, and/or otherwise electronically access a blending machine learning model 802. In various instances, the blending machine learning model 802 can exhibit any suitable machine learning architecture. For example, the blending machine learning model 802 can exhibit a deep learning neural network architecture (e.g., the blending machine learning model 802 can have any suitable number of layers, any suitable numbers of neurons in various layers, any suitable activation functions in various neurons, and/or any suitable interneuron connections). In any case, the blending machine learning model 802 can be configured to receive as input the set of kernel-transformed 3D images 404 (e.g., the kernel-transformed 3D image 1 to the kernel-transformed 3D image n can be concatenated together, and such concatenation can be fed to the blending machine learning model 802) and to produce as output the blended 3D image 602. More specifically, the blending component 116 can feed the set of kernel-transformed 3D images 404 to an input layer of the blending machine learning model 802, the set of kernel-transformed 3D images 404 can complete a forward pass through one or more hidden layers of the blending machine learning model 802, and an output layer of the blending machine learning model 802 can compute the blended 3D image 602 based on activations provided by the one or more hidden layers.

Those having ordinary skill in the art will appreciate that the blending machine learning model 802 can be trained in any suitable fashion so as to facilitate its functionality. For example, in some cases, there can be a blending training dataset that includes multiple sets of training 3D images and multiple annotations that respectively correspond to the multiple sets of training 3D images. That is, each given set of training 3D image can correspond to a given annotation, where the given annotation can be considered as a ground-truth image that represents how the given set of training 3D images are supposed to look after blending is accurately applied to the given set of training 3D images. In various cases, the multiple annotations can be generated in any suitable fashion (e.g., via adaptive blending).

In various aspects, the internal parameters (e.g., weights, biases) of the blending machine learning model 802 can be randomly initialized. For each set of training 3D images and corresponding annotation in the blending training dataset, the blending machine learning model 802 can receive the set of training 3D images as input and can generate some output based on the set of training 3D images. In various instances, the output can be considered as an estimated blended version of the set of training 3D images, whereas the annotation can be considered a ground-truth blended version of the set of training 3D images. Note that, if the blending machine learning model 802 has so far undergone no and/or little training, the output can be highly inaccurate (e.g., can be very different from the annotation). In any case, an error/loss (e.g., cross-entropy) can be computed between the output and the annotation, and the internal parameters of blending machine learning model 802 can be updated via backpropagation that is driven by the computed error/loss. When this training is performed for each set of training 3D images in the blending training dataset, the ultimate result can be that the internal parameters of the blending machine learning model 802 become iteratively optimized for inferring blended versions of inputted sets of 3D images. Those having ordinary skill in the art will appreciate that any suitable training batch sizes, any suitable training termination criteria, and/or any suitable error/loss functions can be implemented.

Those having ordinary skill in the art will appreciate that, in some embodiments, the blending machine learning model 802 can be replaced with a feature-guided model (e.g., a model that can be trained to facilitate tissue-aware blending, anatomy-aware blending, and/or any other suitable type of statistics-driven blending).

In various embodiments, once the blended 3D image 602 is generated by the blending component 116, the image quality improvement system 102 can electronically transmit the blended 3D image 602 to any suitable computing device (not shown), as desired. In some cases, the image quality improvement system 102 can electronically render the blended 3D image 602 (and/or two-dimensional slices of the blended 3D image 602) on any suitable computing screen, display, and/or monitor, as desired (e.g., so that the blended 3D image 602 can be examined by a medical professional).

Figure 9:
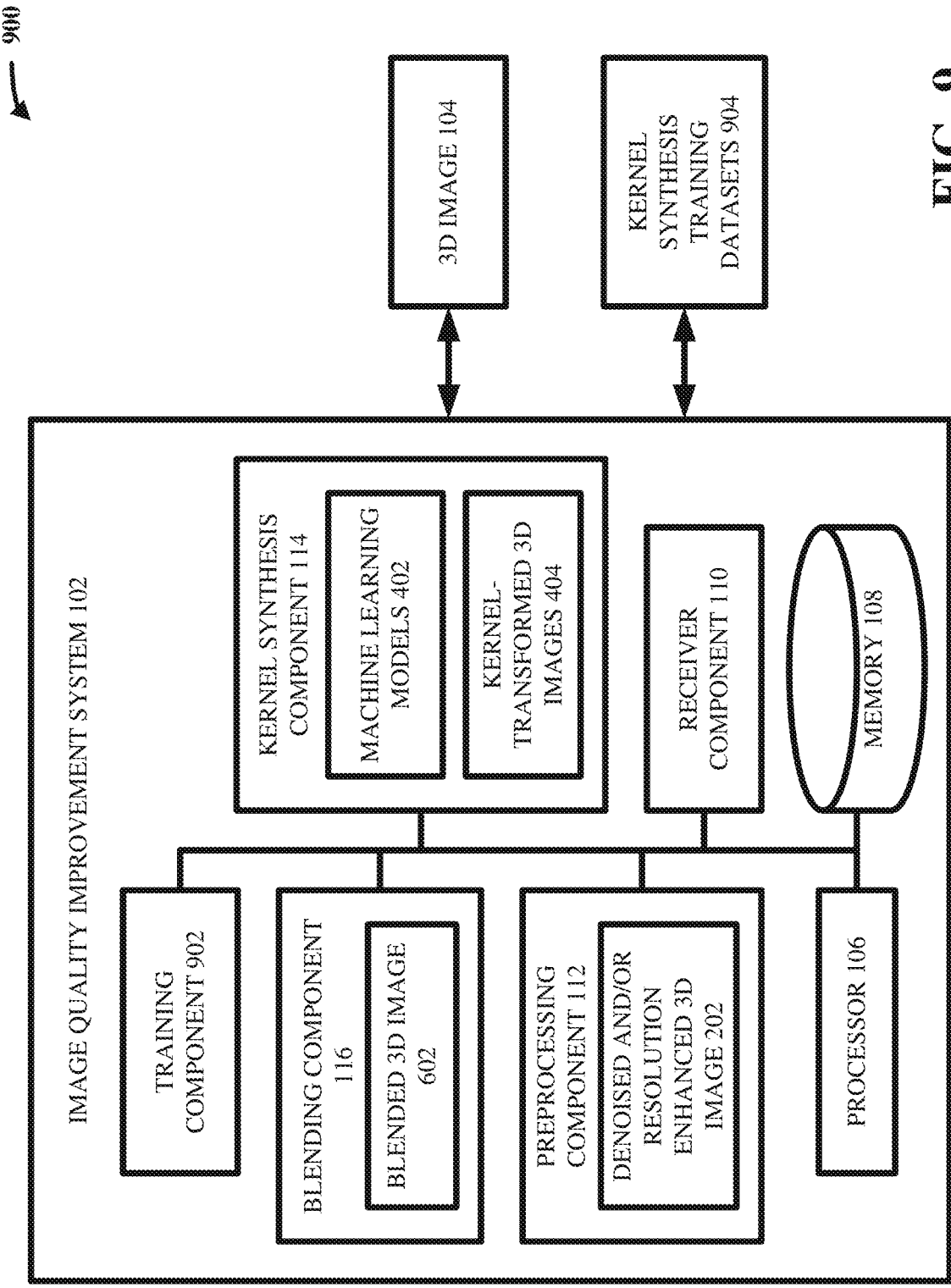
FIG. 9 illustrates a block diagram of an example, non-limiting system including a training component and a set of kernel synthesis training datasets that facilitates machine learning generation of low-noise and high structural conspicuity images in accordance with one or more embodiments described herein.

FIG. 9 illustrates a block diagram of an example, non-limiting system 900 including a training component and a set of kernel synthesis training datasets that can facilitate machine learning generation of low-noise and high structural conspicuity images in accordance with one or more embodiments described herein. As shown, the system 900 can, in some cases, comprise the same components as the system 600, and can further comprise a training component 902 and/or a set of kernel synthesis training datasets 904.

As mentioned above, the set of machine learning models 402 should first be trained (e.g., via backpropagation) so as to facilitate their functionalities. In various embodiments, the receiver component 110 can electronically receive and/or access the set of kernel synthesis training datasets 904, and the training component 902 can electronically train the set of machine learning models 402 on the set of kernel synthesis training datasets 904, as described with respect to FIGS. 10-11.

Figure 10:
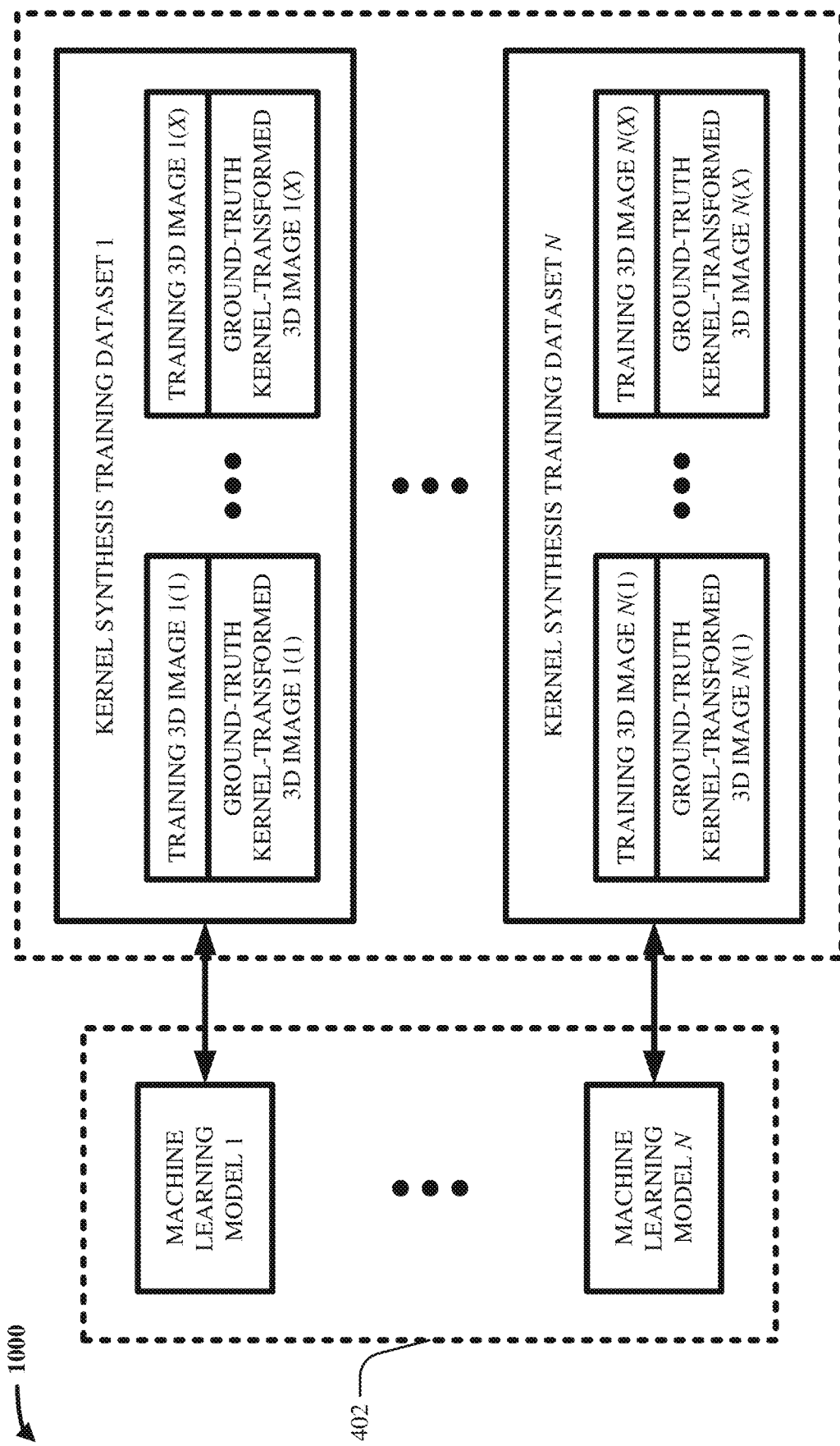
FIG. 10 illustrates a block diagram of an example, non-limiting set of kernel synthesis training datasets in accordance with one or more embodiments described herein.

FIG. 10 illustrates a block diagram 1000 of an example, non-limiting set of kernel synthesis training datasets in accordance with one or more embodiments described herein. In other words, FIG. 10 depicts a non-limiting example embodiment of the set of kernel synthesis training datasets 904.

As mentioned above, the set of machine learning models 402 can include n models. In various aspects, the set of kernel synthesis training datasets 904 can respectively correspond to the set of machine learning models 402. Accordingly, in various cases, the set of kernel synthesis training datasets 904 can include n datasets: a kernel synthesis training dataset 1 to a kernel synthesis training dataset n. In various instances, as shown, each kernel synthesis training dataset of the set of kernel synthesis training datasets 904 can include any suitable number of training tuples, where each training tuple can include a training 3D image and a ground-truth kernel-transformed 3D image that corresponds to the training 3D image.

For example, the kernel synthesis training dataset 1 can include x training tuples: a first training tuple made up of a training 3D image 1(1) and a ground-truth kernel-transformed 3D image 1(1) to an x-th training tuple made up of a training 3D image 1(x) and a ground-truth kernel-transformed 3D image 1(x). In various cases, the ground-truth kernel-transformed 3D image 1(1) can be considered as a known annotation that corresponds to the training 3D image 1(1). That is, the ground-truth kernel-transformed 3D image 1(1) can be considered as representing the known and/or correct result that should be obtained when a desired type of kernel (e.g., bone kernel) is applied to the training 3D image 1(1). In various instances, the ground-truth kernel-transformed 3D image 1(1) can be obtained by decomposing the training 3D image 1(1) into sinograms, convolving the sinograms with the desired type of kernel, and applying image reconstruction to the convolved sinograms. Likewise, the ground-truth kernel-transformed 3D image 1(x) can be considered as a known annotation that corresponds to the training 3D image 1(x). Again, this means that the ground-truth kernel-transformed 3D image 1(x) can be considered as representing the known and/or correct result that should be obtained when the desired type of kernel (e.g., bone kernel) is applied to the training 3D image 1(x). As above, the ground-truth kernel-transformed 3D image 1(x) can be obtained by decomposing the training 3D image 1(x) into sinograms, convolving the sinograms with the desired type of kernel, and applying image reconstruction to the convolved sinograms.

As another example, the kernel synthesis training dataset n can include x training tuples: a first training tuple made up of a training 3D image n(1) and a ground-truth kernel-transformed 3D image n(1) to an x-th training tuple made up of a training 3D image n(x) and a ground-truth kernel-transformed 3D image n(x). In various aspects, the ground-truth kernel-transformed 3D image n(1) can be considered as a known annotation that corresponds to the training 3D image n(1). So, the ground-truth kernel-transformed 3D image n(1) can be considered as representing the known and/or correct result that should be obtained when a desired type of kernel (e.g., lung kernel) is applied to the training 3D image n(1). In various instances, the ground-truth kernel-transformed 3D image n(1) can be obtained by decomposing the training 3D image n(1) into sinograms, convolving the sinograms with the desired type of kernel, and applying image reconstruction to the convolved sinograms. Similarly, the ground-truth kernel-transformed 3D image n(x) can be considered as a known annotation that corresponds to the training 3D image n(x). Again, this means that the ground-truth kernel-transformed 3D image n(x) can be considered as representing the known and/or correct result that should be obtained when the desired type of kernel (e.g., lung kernel) is applied to the training 3D image n(x). As above, the ground-truth kernel-transformed 3D image n(x) can be obtained by decomposing the training 3D image n(x) into sinograms, convolving the sinograms with the desired type of kernel, and applying image reconstruction to the convolved sinograms.

Although FIG. 10 illustrates the kernel synthesis training dataset 1 and the kernel synthesis training dataset n as having the same number of training tuples (e.g., x), this is a mere non-limiting example. Those having ordinary skill in the art will appreciate that the kernel synthesis training dataset 1 can have the same and/or different number of training tuples as the kernel synthesis training dataset n.

As shown, in various aspects, the kernel synthesis training dataset 1 can correspond to the machine learning model 1. This can mean that the machine learning model 1 can be trained on the kernel synthesis training dataset 1. Likewise, in various instances, the kernel synthesis training dataset n can correspond to the machine learning model n. This can mean that the machine learning model n can be trained on the kernel synthesis training dataset n. Such training is described with respect to FIG. 11.

Figure 11:
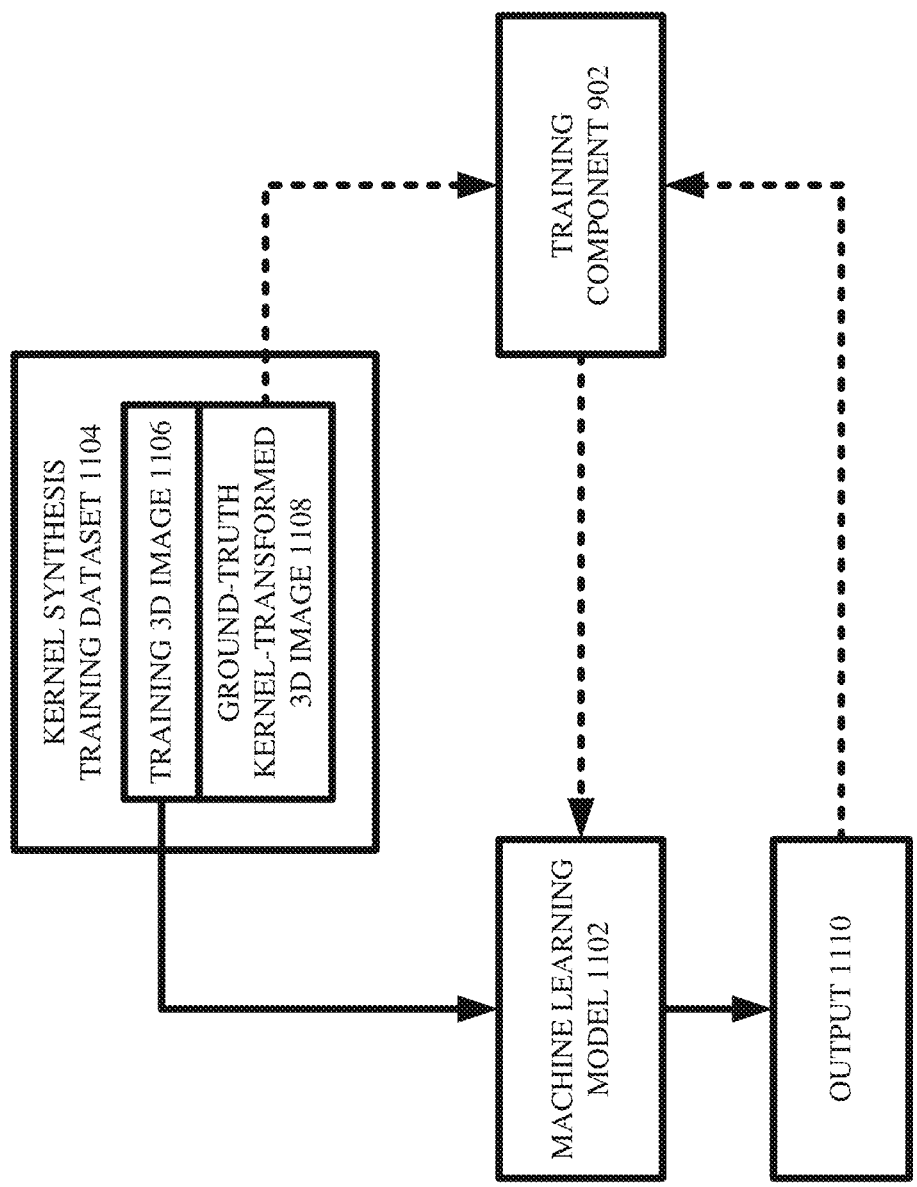
FIG. 11 illustrates an example, non-limiting block diagram showing how a set of machine learning models can be trained based on a kernel synthesis training dataset in accordance with one or more embodiments described herein.

FIG. 11 illustrates an example, non-limiting block diagram 1100 showing how a set of machine learning models can be trained based on a kernel synthesis training dataset in accordance with one or more embodiments described herein.

In various embodiments, there can be a machine learning model 1102 and a kernel synthesis training dataset 1104. In various aspects, the machine learning model 1102 can be any of the set of machine learning models 402. In various instances, one of the set of kernel synthesis training datasets 904 can correspond to the machine learning model 1102. This corresponding kernel synthesis training dataset can be considered and/or referred to as the kernel synthesis training dataset 1104. In various cases, the internal parameters (e.g., weights, biases) of the machine learning model 1102 can be randomly initialized. In various aspects, the training component 902 can select a training tuple from the kernel synthesis training dataset 1104. In various instances, such training tuple can include a training 3D image 1106 and a ground-truth kernel-transformed 3D image 1108 that corresponds to the training 3D image 1106.

In various cases, the training component 902 can feed the training 3D image 1106 to the machine learning model 1102, and this can cause the machine learning model 1102 to generate an output 1110. More specifically, an input layer of the machine learning model 1102 can receive the training 3D image 1106, the training 3D image 1106 can complete a forward pass through one or more hidden layers of the machine learning model 1102, and an output layer of the machine learning model 1102 can compute the output 1110 based on activations provided by the one or more hidden layers of the machine learning model 1102. In various aspects, the output 1110 can be considered as representing an estimated kernel-transformed version of the training 3D image 1106, whereas the ground-truth kernel-transformed 3D image 1108 can be considered as representing the actual known kernel-transformed version of the training 3D image 1106. Note that, if the machine learning model 1102 has so far undergone no and/or little training, the output 1110 can be highly inaccurate (e.g., can be very different, in terms of Euclidean distance and/or cosine similarity, from the ground-truth kernel-transformed 3D image 1108). Accordingly, the training component 902 can compute an error/loss (e.g., cross-entropy) between the output 1110 and the ground-truth kernel-transformed 3D image 1108, and the training component 902 can update the internal parameters of the machine learning model 1102 via backpropagation based on the computed error/loss.

In various aspects, the training component 902 can repeat this procedure for each training tuple in the kernel synthesis training dataset 1104, with the ultimate result being that the internal parameters of the machine learning model 1102 become iteratively optimized for inferring a particular type of kernel-transformed version of inputted 3D images. Those having ordinary skill in the art will appreciate that any suitable training batch sizes, any suitable training termination criteria, and/or any suitable error/loss functions can be implemented as desired.

In various cases, each of the set of machine learning models 402 can be trained as described with respect to FIG. 11.

In some cases, the training component 902 can train any other machine learning models utilized by the image quality improvement system 102 in a similar supervised fashion as desired (e.g., can train the denoising machine learning model 308, the resolution enhancement machine learning model 312, the joint denoising and resolution enhancement machine learning model 314, and/or the blending machine learning model 802 based on any suitable training datasets).

FIGS. 12-17 illustrate example, non-limiting images associated with and/or generated by various embodiments described herein. In other words, FIGS. 12-17 show some benefits of various embodiments of the subject innovation.

In various cases, as mentioned above, performing a given kernel-transformation of a 3D image can improve structural conspicuity for a given image feature type. However, the present inventors recognized that analytically performing the given kernel transformation can have the unfortunate side-effect of simultaneously increasing noise in the resulting 3D image for other image feature types. For example, a bone kernel transformation being analytically applied to a 3D image can improve the conspicuity of bone tissue depicted in the 3D image but can increase noise in non-bone tissue depicted in the 3D image. As another example, a lung kernel transformation being analytically applied to a 3D image can improve the conspicuity of lung tissue depicted in the 3D image but can increase noise in non-lung tissue depicted in the 3D image. As yet another example, a soft tissue kernel transformation being analytically applied to a 3D image can improve conspicuity of soft tissue depicted in the 3D image but can increase noise in non-soft-tissue depicted in the 3D image.

The present inventors attempted to counteract such increased noise by analytically applying denoising techniques before and/or after an analytical kernel transformation. However, the present inventors recognized that analytical denoising can have the unfortunate side-effect of blurring an image and/or otherwise reducing structural conspicuity of the image. In other words, analytical denoising and analytical kernel transformation can, in some aspects, be considered as partially countering and/or partially cancelling each other.

Fortunately, the present inventors devised a solution to this technical problem. Specifically, the present inventors recognized that first applying denoising (e.g., either analytically and/or via machine learning) and then subsequently applying a kernel-transformation via machine learning can result in an image that displays both high structural conspicuity without increased levels of noise, as opposed to an image that has high structural conspicuity with high noise, and as opposed to an image that has low noise with low structural conspicuity. Non-limiting examples are shown in FIG. 12-17.

Figure 12:
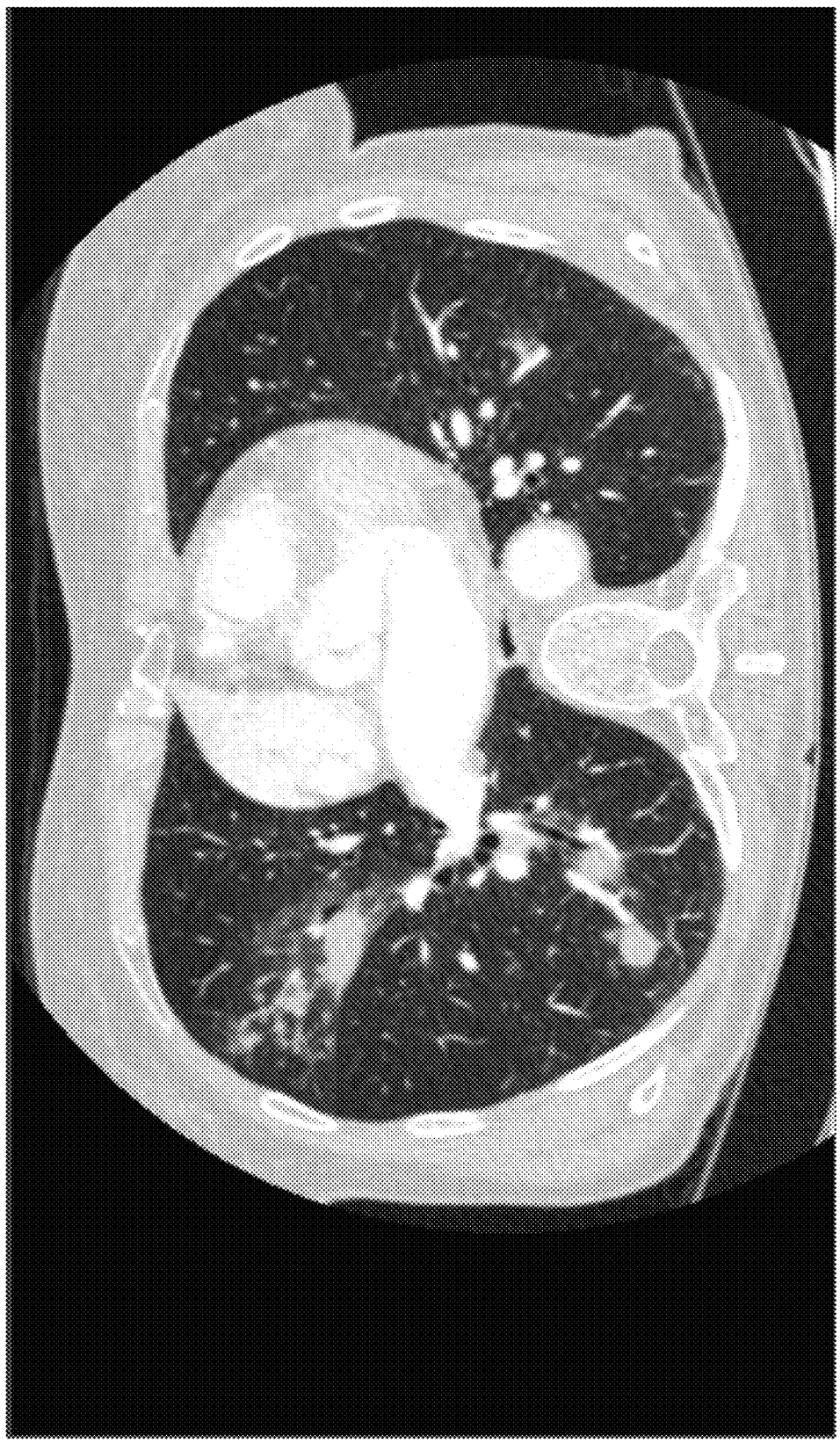

FIG. 12 illustrates an example CT scan 1200. In some cases, the CT scan 1200 can be considered as a non-limiting example embodiment of a two-dimensional slice/projection of the 3D image 104. As one having ordinary skill in the art will appreciate, the CT scan 1200 exhibits a low noise level but also a low level of structural conspicuity (e.g., the small details of the CT scan 1200 are visibly blurry).

Figure 13:
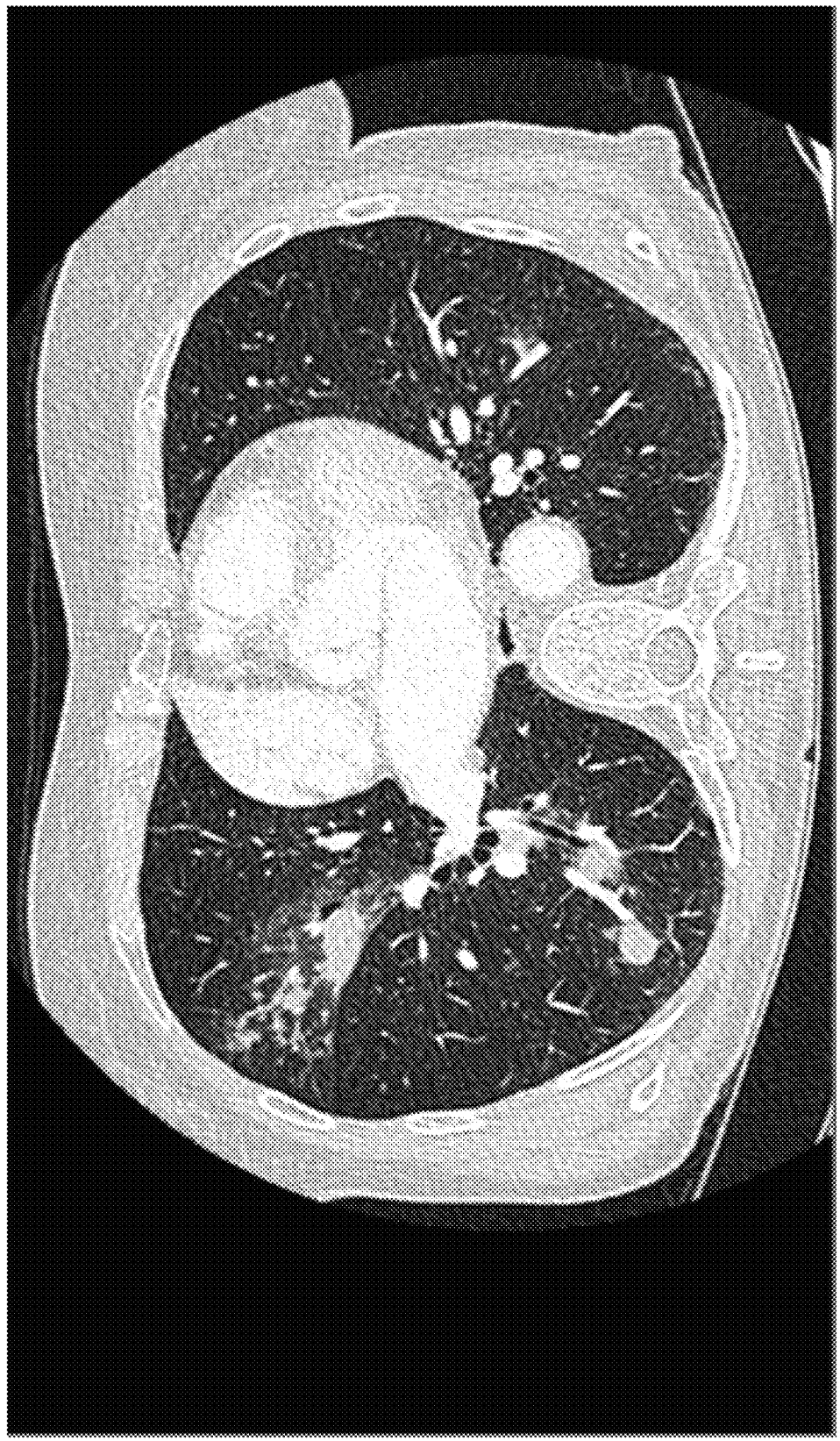

FIG. 13 illustrates an example CT scan 1300. In some cases, the CT scan 1300 can be considered as the result that is obtained when an analytical lung kernel transformation is performed on the CT scan 1200 (e.g., the CT scan 1200 can be convolved with a kernel that is designed to improve conspicuity of lung tissue). As one having ordinary skill in the art will appreciate, the CT scan 1300 exhibits increased structural conspicuity of lung tissue as compared to the CT scan 1200 (e.g., the blurry lung details in the CT scan 1200 are shown as not blurry in the CT scan 1300). However, as one having ordinary skill in the art will further appreciate, the CT scan 1300 exhibits increased noise in non-lung features as compared to the CT scan 1200 (e.g., the rib-cage depicted in the CT scan 1300 has significantly increased static noise).

Figure 14:
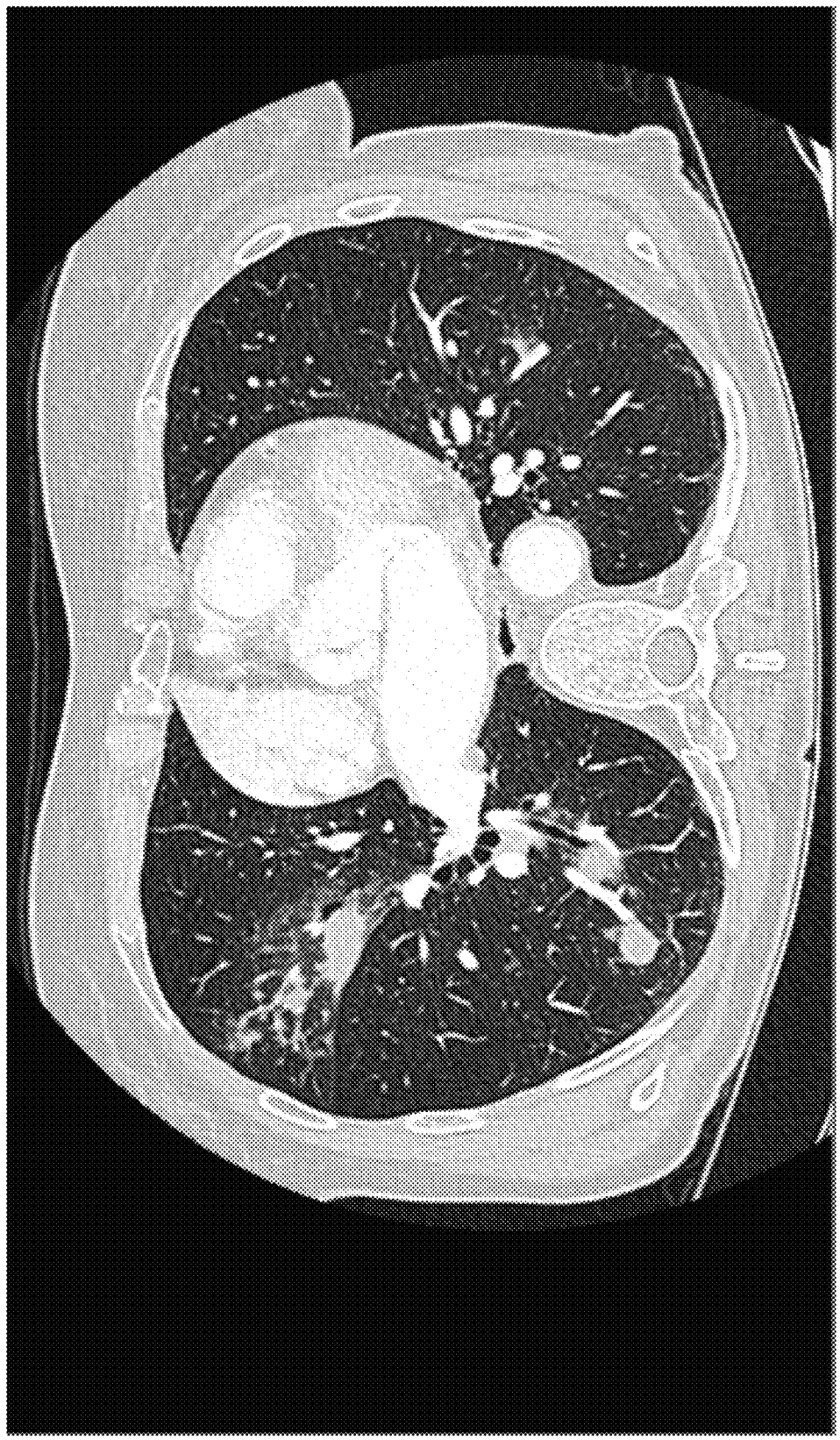

FIG. 14 illustrates an example CT scan 1400. In some cases, the CT scan 1400 can be considered as the result that is obtained when the CT scan 1200 first undergoes denoising (e.g., as performed by the preprocessing component 112) and then undergoes a lung-kernel-transformation (e.g., as performed by the kernel synthesis component 114). In other words, the CT scan 1400 can be considered as a two-dimensional slice/projection of one of the set of kernel-transformed 3D images 404. As one having ordinary skill in the art will appreciate, the CT scan 1400 exhibits high structural conspicuity for lung tissue while, at the same time, exhibiting low noise for non-lung tissue (e.g., the rib-cage depicted in the CT scan 1400 does not have significant noise, whereas the rib-cage depicted in the CT scan 1300 does have significant noise).

FIG. 15 shows another example of improved structural conspicuity without increased noise. As shown, FIG. 15 depicts a CT scan 1502 and a CT scan 1504. In some cases, the CT scan 1502 can be considered as having undergone analytical lung-kernel transformation. In contrast, the CT scan 1504 can be considered as having undergone denoising (e.g., as performed by the preprocessing component 112) and lung-kernel transformation (e.g., as performed by the kernel synthesis component 114). As those having ordinary skill in the art will appreciate, the CT scan 1504 exhibits significantly improved structural conspicuity and significantly reduced noise with respect to the CT scan 1502.

Figure 17:
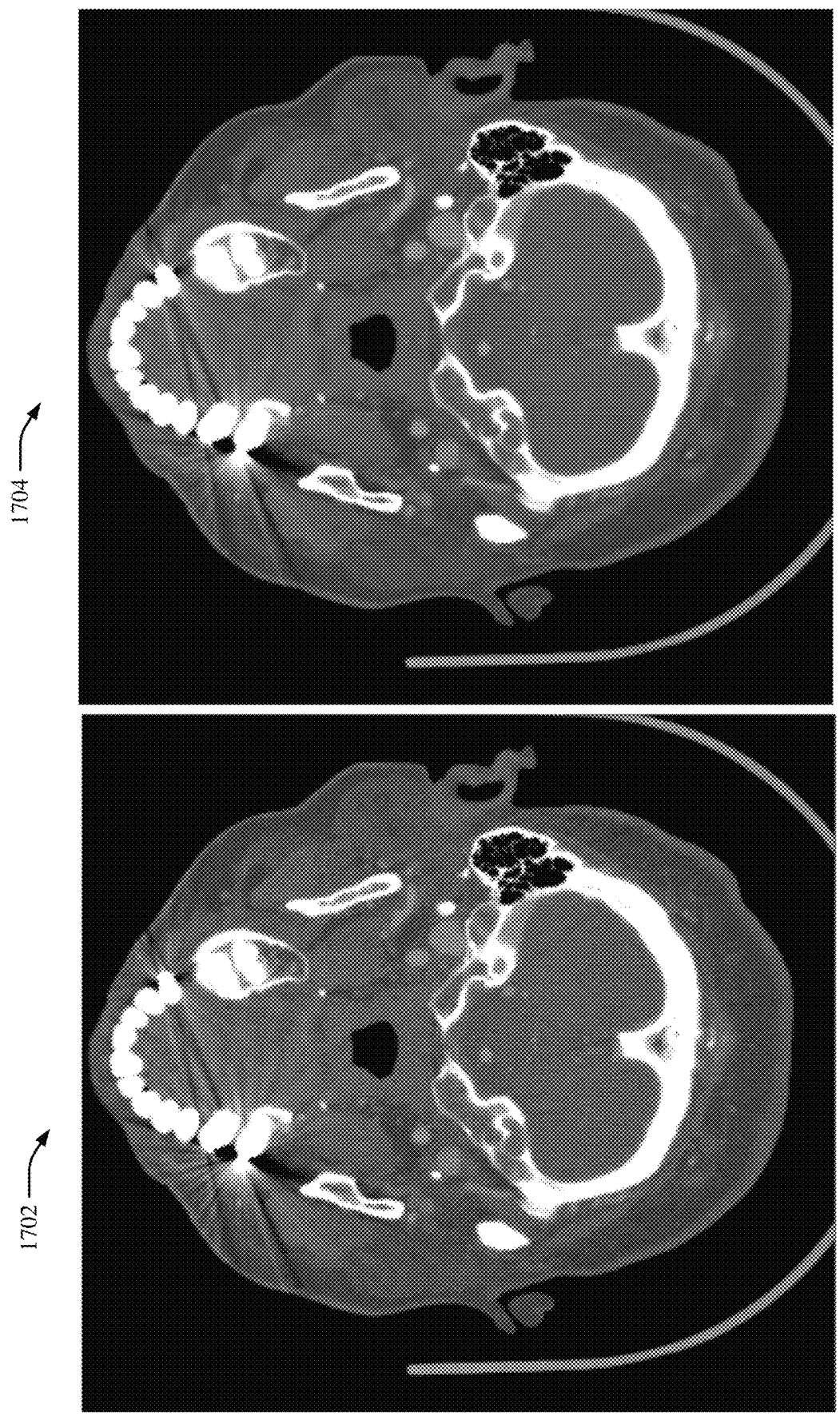

FIGS. 16-17 show analogous results. Specifically, FIG. 16 shows a CT scan 1602 that was generated by applying an analytical kernel transformation to a CT image, and FIG. 16 also shows a CT scan 1604 that was generated by various embodiments of the subject innovation (e.g., first denoising via the preprocessing component 112 and then kernel transformation via the kernel synthesis component 114). As can be seen, the CT scan 1604 exhibits improved conspicuity and less noise than the CT scan 1602. Likewise, FIG. 17 shows a CT scan 1702 that was generated by applying an analytical kernel transformation to a CT image, and FIG. 17 also shows a CT scan 1704 that was generated by various embodiments of the subject innovation (e.g., first denoising via the preprocessing component 112 and then kernel transformation via the kernel synthesis component 114). As can be seen, the CT scan 1704 exhibits improved conspicuity and less noise than the CT scan 1702.

Figure 18:
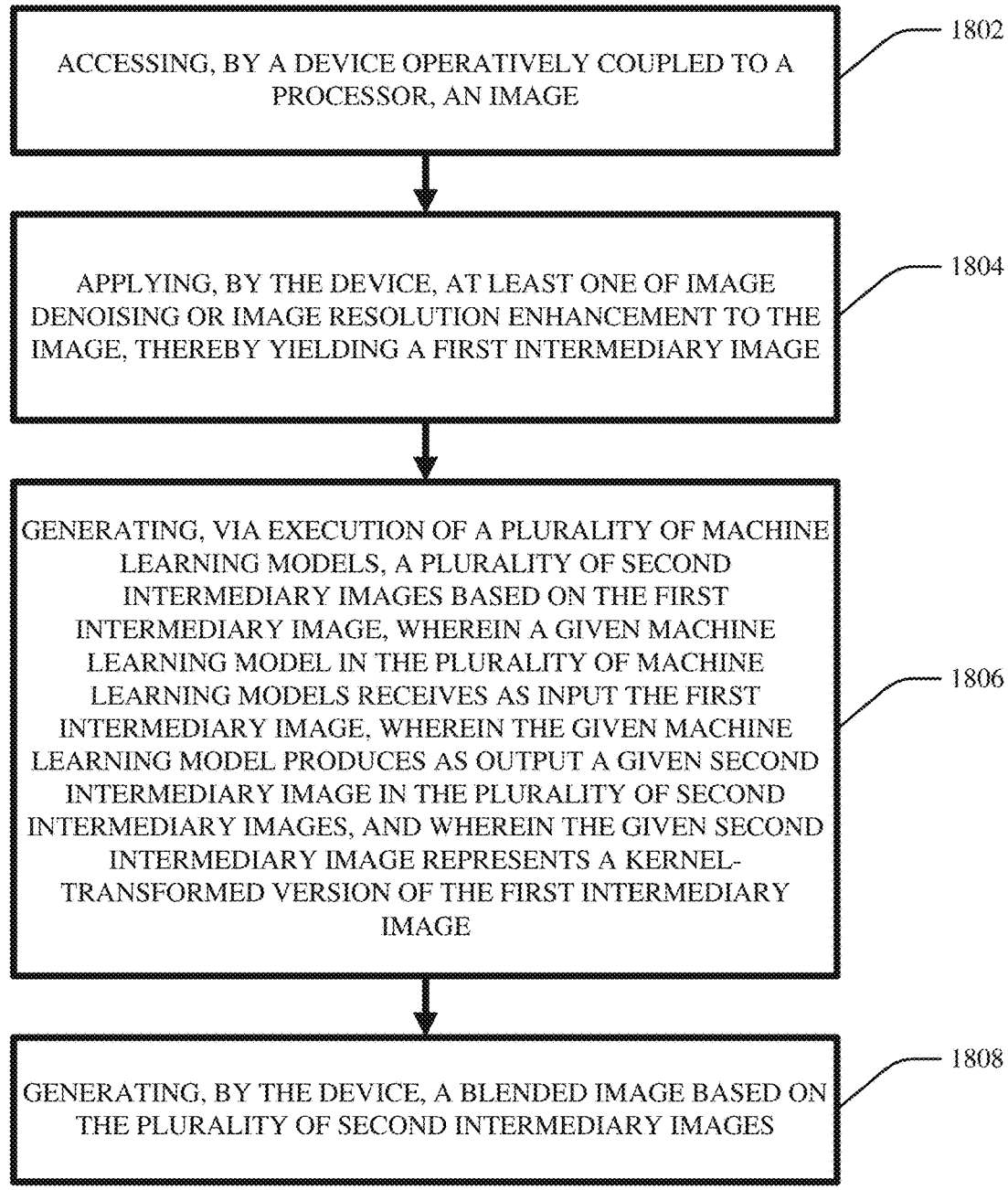
FIG. 18 illustrates a flow diagram of an example, non-limiting computer-implemented method that facilitates machine learning generation of low-noise and high structural conspicuity images in accordance with one or more embodiments described herein.

FIG. 18 illustrates a flow diagram of an example, non-limiting computer-implemented method 1800 that can facilitate machine learning generation of low-noise and high structural conspicuity images in accordance with one or more embodiments described herein. In various cases, the image quality improvement system 102 can facilitate the computer-implemented method 1800.

In various embodiments, act 1802 can include accessing, by a device (e.g., via 110) operatively coupled to a processor, an image (e.g., 104).

In various aspects, act 1804 can include applying, by the device (e.g., via 112), at least one of image denoising or image resolution enhancement to the image, thereby yielding a first intermediary image (e.g., 202).

In various instances, act 1806 can include generating, by the device (e.g., via 114) and via execution of a plurality of machine learning models (e.g., 402), a plurality of second intermediary images (e.g., 404) based on the first intermediary image. In various cases, a given machine learning model (e.g., machine learning model n in FIG. 5) in the plurality of machine learning models can receive as input the first intermediary image, the given machine learning model can produce as output a given second intermediary image (e.g., kernel-transformed 3D image n) in the plurality of second intermediary images, and the given second intermediary image can represent a kernel-transformed version of the first intermediary image.

In various aspects, act 1808 can include generating, by the device (e.g., via 116), a blended image (e.g., 602) based on the plurality of second intermediary images.

Although not explicitly shown in FIG. 18, the generating the blended image can include implementing, by the device (e.g., via 116), adaptive blending.

Although not explicitly shown in FIG. 18, the applying the at least one of image denoising or image resolution enhancement to the image can include executing, by the device (e.g., via 112), another machine learning model (e.g., 314), wherein the another machine learning model can receive as input the image and can produce as output the first intermediary image.

Although not explicitly shown in FIG. 18, the applying the at least one of image denoising or image resolution enhancement to the image can include applying, by the device (e.g., via 112), both image denoising and image resolution enhancement to the image.

Although not explicitly shown in FIG. 18, a first machine learning model in the plurality of machine learning models can be trained to mimic a bone kernel transformation, a second machine learning model in the plurality of machine learning models can be trained to mimic a soft tissue kernel transformation, and a third machine learning model in the plurality of machine learning models can be trained to mimic a lung kernel transformation.

Various embodiments described herein include a computerized tool that can electronically access a 3D image and that can electronically improve the visual quality of the 3D image by executing a multi-tiered machine learning architecture. Specifically, the computerized tool can apply denoising and/or resolution enhancement to the 3D image, the computerized tool can execute a plurality of machine learning models on the 3D image to yield a plurality of kernel-transformed 3D images each of which exhibits improved visual quality of a respectively corresponding image feature, and the computerized tool can blend the plurality of kernel-transformed 3D images together to form a blended 3D image that exhibits improved visual qualities across a plurality of image features.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)$=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For case of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 19:
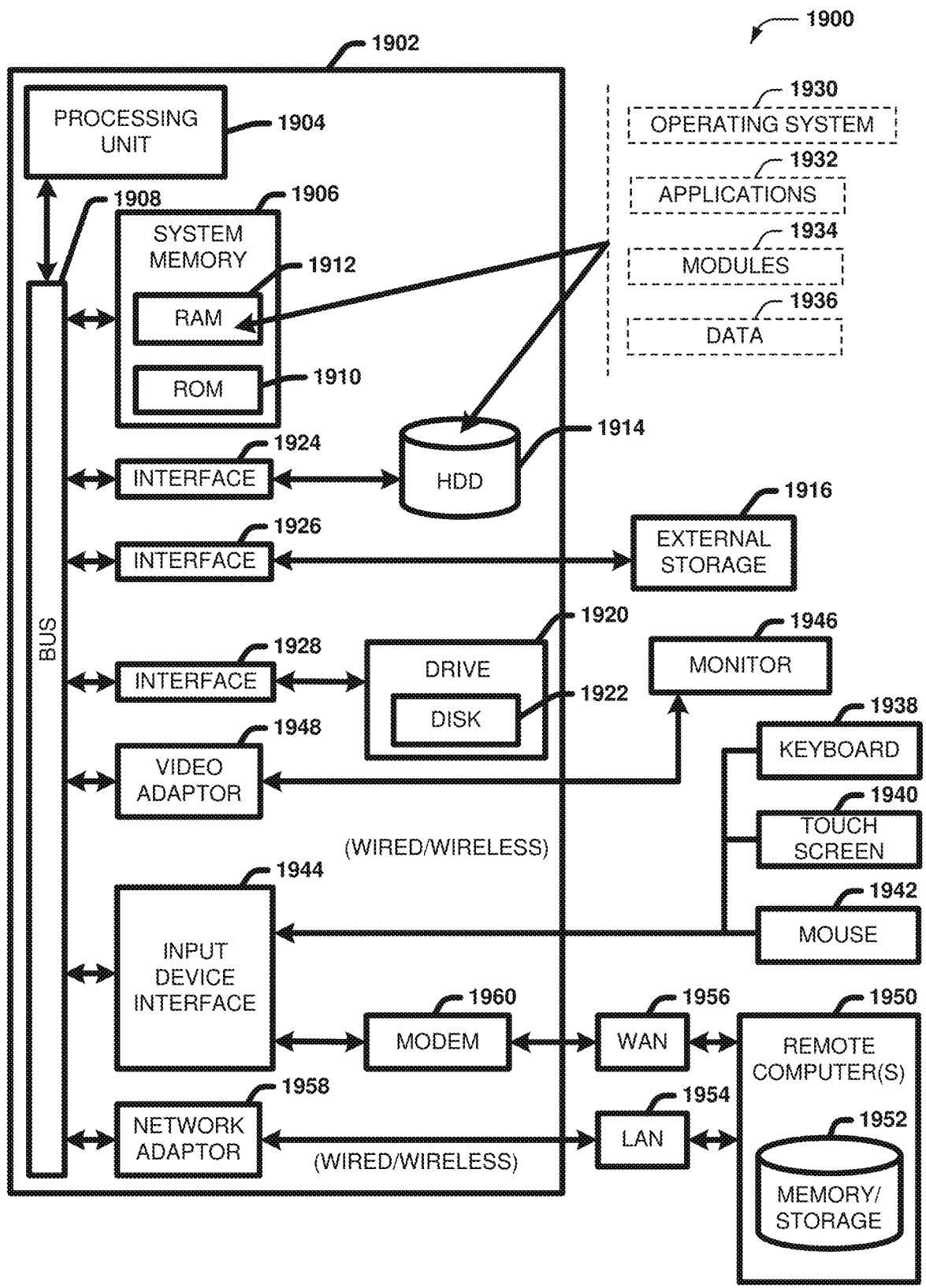
FIG. 19 illustrates a block diagram of an example, non-limiting operating environment in which one or more embodiments described herein can be facilitated.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and a drive 1920, e.g., such as a solid state drive, an optical disk drive, which can read or write from a disk 1922, such as a CD-ROM disc, a DVD, a BD, etc. Alternatively, where a solid state drive is involved, disk 1922 would not be included, unless separate. While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and drive 1920 can be connected to the system bus 1908 by an HDD interface 1924, an external storage interface 1926 and a drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the Internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above, such as but not limited to a network virtual machine providing one or more aspects of storage or processing of information. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 20:
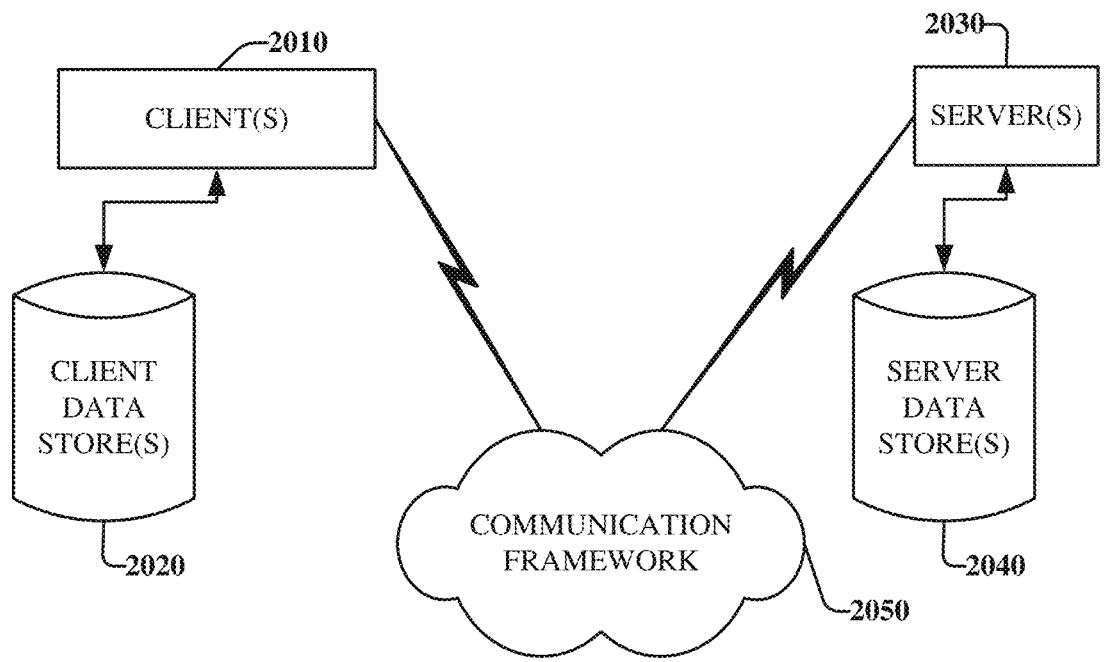
FIG. 20 illustrates an example networking environment operable to execute various implementations described herein.

FIG. 20 is a schematic block diagram of a sample computing environment 2000 with which the disclosed subject matter can interact. The sample computing environment 2000 includes one or more client(s) 2010. The client(s) 2010 can be hardware and/or software (e.g., threads, processes, computing devices). The sample computing environment 2000 also includes one or more server(s) 2030. The server(s) 2030 can also be hardware and/or software (e.g., threads, processes, computing devices). The servers 2030 can house threads to perform transformations by employing one or more embodiments as described herein, for example. One possible communication between a client 2010 and a server 2030 can be in the form of a data packet adapted to be transmitted between two or more computer processes. The sample computing environment 2000 includes a communication framework 2050 that can be employed to facilitate communications between the client(s) 2010 and the server(s) 2030. The client(s) 2010 are operably connected to one or more client data store(s) 2020 that can be employed to store information local to the client(s) 2010. Similarly, the server(s) 2030 are operably connected to one or more server data store(s) 2040 that can be employed to store information local to the servers 2030.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer-executable components stored in a computer-readable memory, the computer-executable components comprising:
      a receiver component that accesses an image;
      a preprocessing component that applies at least one of image denoising or image resolution enhancement to the image, thereby yielding a first intermediary image;
      a kernel synthesis component that generates, via execution of a plurality of machine learning models trained using different respective frequency kernels, a plurality of second intermediary images based on the first intermediary image, wherein each machine learning model in the plurality of machine learning models receives as input the first intermediary image and produces as output a respective second intermediary image of the plurality of second intermediary images, and wherein the respective second intermediary image represents a frequency kernel-transformed version of the first intermediary image according to a respective frequency kernel at which the machine learning model was trained; and
      a blending component that generates a blended image based on the plurality of second intermediary images.

2. The system of claim 1, wherein the blending component generates the blended image via execution of a blending machine learning model, wherein the blending machine learning model receives as input the plurality of second intermediary images and produces as output the blended image.

3. The system of claim 1, wherein the blending component generates the blended image via adaptive blending.

4. The system of claim 1, wherein the preprocessing component applies the at least one of the image denoising or the image resolution enhancement to the image via execution of another machine learning model, wherein the another machine learning model receives as input the image and produces as output the first intermediary image.

5. The system of claim 1, wherein the preprocessing component applies both the image denoising and the image resolution enhancement to the image.

6. The system of claim 1, wherein the image is a three-dimensional computed tomography voxel array.

7. The system of claim 1, wherein a first machine learning model in the plurality of machine learning models is trained to mimic a first frequency kernel transformation, and wherein a second machine learning model in the plurality of machine learning models is trained to mimic a second frequency kernel transformation, wherein the first frequency kernel transformation is different from the second frequency kernel transformation.

8. A computer-implemented method, comprising:
accessing, by a device operatively coupled to a processor, an image;
applying, by the device, at least one of image denoising or image resolution enhancement to the image, thereby yielding a first intermediary image;
generating, by the device and via execution of a plurality of machine learning models trained using different respective frequency kernels, a plurality of second intermediary images based on the first intermediary image, wherein each machine learning model in the plurality of machine learning models receives as input the first intermediary image and produces as output a respective second intermediary image of the plurality of second intermediary images, and wherein the respective second intermediary image represents a frequency kernel-transformed version of the first intermediary image according to a respective frequency kernel at which the machine learning model was trained; and
generating, by the device, a blended image based on the plurality of second intermediary images.

9. The computer-implemented method of claim 8, wherein the generating the blended image includes executing, by the device, a blending machine learning model, wherein the blending machine learning model receives as input the plurality of second intermediary images and produces as output the blended image.

10. The computer-implemented method of claim 8, wherein the generating the blended image includes implementing, by the device, adaptive blending.

11. The computer-implemented method of claim 8, wherein the applying the at least one of the image denoising or the image resolution enhancement to the image includes executing, by the device, another machine learning model, wherein the another machine learning model receives as input the image and produces as output the first intermediary image.

12. The computer-implemented method of claim 8, wherein the applying the at least one of the image denoising or the image resolution enhancement to the image includes applying, by the device, both the image denoising and the image resolution enhancement to the image.

13. The computer-implemented method of claim 8, wherein the image is a three-dimensional computed tomography voxel array.

14. The computer-implemented method of claim 8, wherein a first machine learning model in the plurality of machine learning models is trained to mimic a first frequency kernel transformation, and wherein a second machine learning model in the plurality of machine learning models is trained to mimic a second frequency kernel transformation, wherein the first frequency kernel transformation is different from the second frequency kernel transformation.

15. A computer program product for facilitating machine learning generation of low-noise and high structural conspicuity images, the computer program product comprising a non-transitory computer-readable medium having program instructions embodied therewith, the program instructions executable by a processor to cause the processor to:
access an image;
apply at least one of image denoising or image resolution enhancement to the image, thereby yielding a first intermediary image;
generate, via execution of a plurality of machine learning models trained using different respective frequency kernels, a plurality of second intermediary images based on the first intermediary image, wherein each machine learning model in the plurality of machine learning models receives as input the first intermediary image and produces as output a respective second intermediary image of the plurality of second intermediary images, and wherein the respective second intermediary image represents a frequency kernel-transformed version of the first intermediary image according to a respective frequency kernel at which the machine learning model was trained; and
generate a blended image based on the plurality of second intermediary images.

16. The computer program product of claim 15, wherein the processor generates the blended image via execution of a blending machine learning model, wherein the blending machine learning model receives as input the plurality of second intermediary images and produces as output the blended image.

17. The computer program product of claim 15, wherein the processor generates the blended image via adaptive blending.

18. The computer program product of claim 15, wherein the processor applies the at least one of the image denoising or the image resolution enhancement to the image via execution of another machine learning model, wherein the another machine learning model receives as input the image and produces as output the first intermediary image.

19. The computer program product of claim 15, wherein the processor applies both the image denoising and the image resolution enhancement to the image.

20. The computer program product of claim 15, wherein the image is a three-dimensional computed tomography voxel array.

* * * * *